United States Patent
Ayabe et al.

(10) Patent No.: US 6,931,315 B2
(45) Date of Patent: Aug. 16, 2005

(54) SHIFT CONTROL APPARATUS AND SHIFT CONTROL METHOD FOR A VEHICULAR AUTOMATIC TRANSMISSION

(75) Inventors: Atsushi Ayabe, Toyota (JP); Toshio Sugimura, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 89 days.

(21) Appl. No.: 10/702,634

(22) Filed: Nov. 7, 2003

(65) Prior Publication Data

US 2004/0106497 A1 Jun. 3, 2004

(30) Foreign Application Priority Data

Dec. 2, 2002 (JP) ........................................ 2002-350524
Dec. 2, 2002 (JP) ........................................ 2002-350525

(51) Int. Cl.[7] ............................................. F16H 61/00
(52) U.S. Cl. ............................. 701/59; 701/54; 477/118
(58) Field of Search ............................. 701/54, 53, 58, 701/59; 477/107, 108, 109, 118, 132, 135, 140, 156, 121

(56) References Cited

U.S. PATENT DOCUMENTS 5,547,437 A * 8/1996 Kamada et al. ............. 477/143
5,961,421 A * 10/1999 Hoshiya et al. ............. 477/140
6,022,293 A * 2/2000 Dourra et al. ............... 477/158
6,370,465 B1 * 4/2002 Jeon ............................. 701/58
6,491,605 B2 * 12/2002 Saito et al. .................. 477/154
6,577,940 B2 * 6/2003 Saito et al. .................... 701/59

FOREIGN PATENT DOCUMENTS

| JP | 04-278844 | * 10/1992 |
| JP | 11-287317 | 10/1999 |
| JP | 11-287318 | 10/1999 |

* cited by examiner

Primary Examiner—Michael J. Zanelli
(74) Attorney, Agent, or Firm—Oblon, Spivak, McClelland, Maier & Neustadt, P.C.

(57) ABSTRACT

A shift control apparatus for a vehicular automatic transmission provided with a fuel cut apparatus which cuts off fuel supplied to an engine when an engine speed exceeds a predetermined value during deceleration of a vehicle, and an automatic transmission in which a gear shift is achieved with a clutch-to-clutch downshift in which a hydraulic friction device to be released is released and a hydraulic friction device to be applied is applied, further includes a controller. The controller corrects, through learning control, an apply pressure of at least one of the hydraulic friction devices to be operated for the clutch-to-clutch downshift such that an amount of drop in a rotational speed of an input shaft of the automatic transmission decreases when that amount of drop exceeds a predetermined value during the clutch-to-clutch downshift.

18 Claims, 15 Drawing Sheets

FIG.2

| POSITION | | CLUTCHES & BRAKES | | | | | | | O.W.C. | |
|---|---|---|---|---|---|---|---|---|---|---|
| | | C1 | C0 | C2 | B1 | B2 | C3 | B3 | F1 | F2 |
| N,P | | × | × | × | × | × | × | ○ | × | × |
| R | | × | × | ○ | × | ○ | × | ○ | × | × |
| D | 1st | ○ | × | × | × | × | × | ○ | ○ | △ |
| | 2nd | ○ | × | × | ○ | × | × | ○ | × | △ |
| | 3rd | ○ | ○ | × | × | × | × | ○ | × | △ |
| | 4th | × | ○ | × | ○ | × | × | ○ | × | △ |
| | 5th | × | ○ | × | ○ | × | ○ | × | × | × |
| | 1st ENGINE BRAKE | ○ | × | × | × | ○ | × | ○ | △ | △ |

SHIFT CONTROL APPARATUS AND SHIFT CONTROL METHOD FOR A VEHICULAR AUTOMATIC TRANSMISSION

INCORPORATION BY REFERENCE

The disclosures of Japanese Patent Application No. 2002-350524 filed on Dec. 2, 2002 and No. 2002-350525 filed on Dec. 2, 2002, including the specifications, drawings and abstracts are incorporated herein by reference in their entirety.

BACKGROUND OF THE INVENTION

1. Field of the Invention

The invention relates to a shift control apparatus and shift control method for a vehicular automatic transmission, which enables suppression of a drop in rotational speed of an input shaft which occurs during a clutch-to-clutch downshift executed while a vehicle is decelerating.

2. Description of the Related Art

A shift control apparatus for a vehicular automatic transmission is known which, when executing a clutch-to-clutch downshift, executes shift hydraulic pressure control so as to reduce an apply pressure of a hydraulic friction device to be released, which was applied in order to achieve a predetermined speed before the downshift, while increasing an apply pressure of a hydraulic friction device to be applied in order to achieve a predetermined speed after the downshift. According to JP(A) 11-287318, for example, during the clutch-to-clutch downshift, feedback control is performed on the apply pressure of the hydraulic friction device to be applied so that a transmitted torque capacity of the hydraulic friction device to be applied becomes constant, i.e., so that a rotational speed of an input shaft of the automatic transmission increases at a constant rate.

In the aforementioned shift control apparatus for a vehicular automatic transmission, the engine speed drops during the clutch-to-clutch downshift when the vehicle is decelerating, and then increases again when the hydraulic friction device to be applied is applied. This combination of a drop followed by an increase in engine speed results in shift shock or a delay in the shift time. Also, fuel efficiency may be reduced if the drop in engine speed is large enough to require that the fuel supply be restarted.

SUMMARY OF THE INVENTION

In view of the foregoing problems, this invention thus provides a shift control apparatus and shift control method for a vehicular automatic transmission, which automatically suppresses a drop in engine speed during a clutch-to-clutch downshift executed while a vehicle is decelerating, appropriately reduces or eliminates shift shock or a delay in shift time caused by that drop in engine speed, and appropriately suppresses a reduction in fuel efficiency due to the fuel supply to the engine being restarted due to that drop in engine speed.

One aspect of the invention relates to a shift control apparatus for a vehicular automatic transmission which includes i) a fuel cut apparatus which performs a fuel cut in which a supply of fuel to an engine is cut off when an engine speed exceeds a predetermined value during deceleration of a vehicle, ii) an automatic transmission in which a gear shift is achieved with a clutch-to-clutch downshift in which a hydraulic friction device to be released is released and a hydraulic friction device to be applied is applied, and iii) a controller which corrects, through learning control, an apply pressure of at least one of the hydraulic friction devices to be operated for the clutch-to-clutch downshift such that an amount of drop in a rotational speed of an input shaft of the automatic transmission decreases when that amount of drop exceeds a predetermined value during the clutch-to-clutch downshift.

Also, another aspect of the invention relates to a shift control method for a vehicular automatic transmission which includes a fuel cut apparatus which performs a fuel cut in which a supply of fuel to an engine is cut off when an engine speed exceeds a predetermined value during deceleration of a vehicle, and an automatic transmission in which a gear shift is achieved with a clutch-to-clutch downshift in which a hydraulic friction device to be released is released and a hydraulic friction device to be applied is applied. According to this shift control method, an apply pressure of at least one of the hydraulic friction devices to be operated for the clutch-to-clutch downshift is corrected through learning control such that an amount of drop in a rotational speed of an input shaft of the automatic transmission decreases when that amount of drop exceeds a predetermined value during the clutch-to-clutch downshift.

As a result, the drop in engine speed during a clutch-to-clutch downshift executed while the vehicle is decelerating is automatically suppressed, and shift shock or a delay in shift time caused by that drop in engine speed is appropriately reduced or eliminated. Further, a reduction in fuel efficiency due to the fuel supply to the engine being restarted due to a further drop in engine speed is appropriately suppressed.

In view of the foregoing problems, it is an object of this invention to provide a shift control apparatus for a vehicular automatic transmission, which automatically suppresses a drop in engine speed during a clutch-to-clutch downshift executed while a vehicle is decelerating, appropriately reduces or eliminates shift shock or a delay in shift time caused by that drop in engine speed, and appropriately suppresses a reduction in fuel efficiency due to the fuel supply to the engine being restarted due to a further drop in engine speed.

BRIEF DESCRIPTION OF THE DRAWINGS

The above-mentioned embodiment and other embodiments, objects, features, advantages, technical and industrial significance of this invention will be better understood by reading the following detailed description of the preferred embodiments of the invention, when considered in connection with the accompanying drawings, in which:

FIG. 2 is a clutch and brake application chart showing various application and release combinations of clutches and brakes to achieve specific speeds in the automatic transmission shown in FIG. 1;

DETAILED DESCRIPTION OF THE PREFERRED EMBODIMENTS

In the following description and the accompanying drawings, the present invention will be described in more detail in terms of exemplary embodiments.

Figure 1:
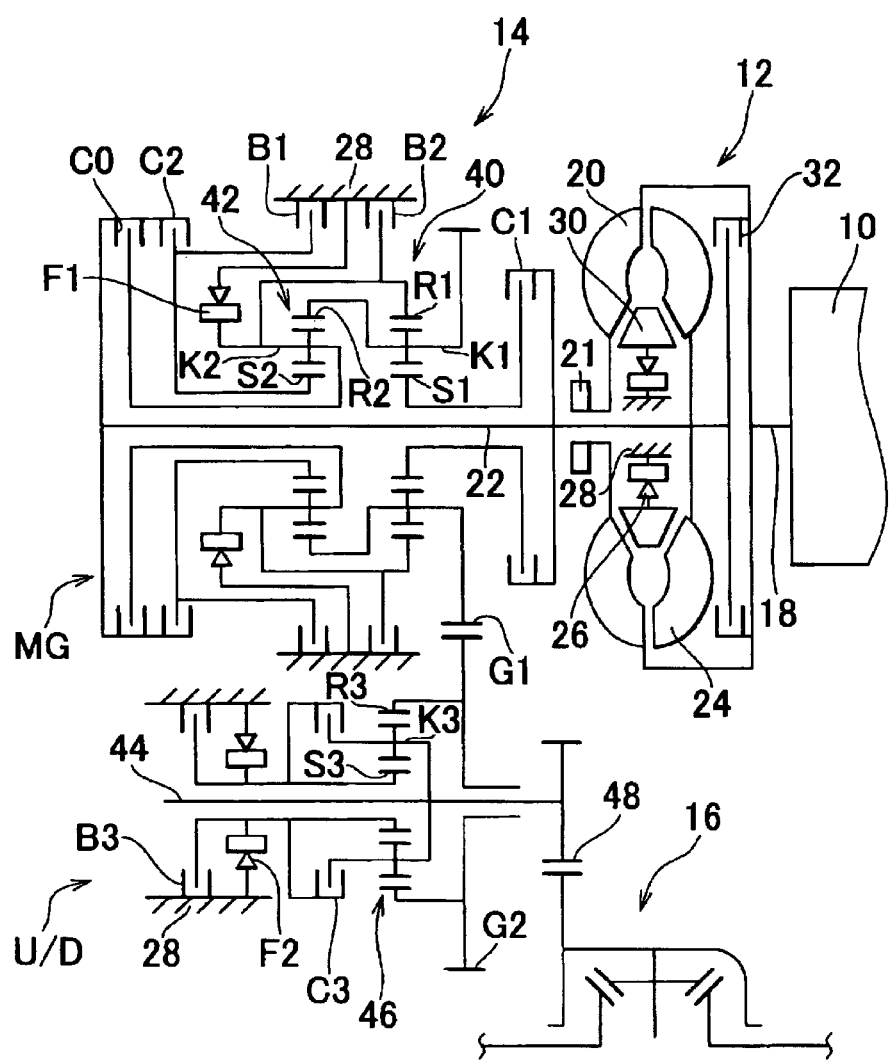
FIG. 1 is a skeleton view illustrating a transverse-mounted vehicular driving apparatus for an FF vehicle to which a shift control apparatus according to one exemplary embodiment of the invention is applied.

FIG. 1 is a skeleton view of a transverse-mounted vehicular driving apparatus for a vehicle such as a FF (front engine, front drive) vehicle. Output from an engine 10, which is an internal combustion engine such as a gasoline engine, is transmitted to driven wheels (front wheels), not shown, via power transmitting apparatuses such as a torque converter 12, an automatic transmission 14, and a differential gear unit 16. The torque converter 12 includes a pump impeller 20 which is connected to a crankshaft 18 of the engine 10, a turbine impeller 24 which is connected to an input shaft 22 of the automatic transmission 14, a stator 30 which is fixed to a housing 28, which is a non-rotatable member, via a one-way clutch 26, and a lockup clutch 32 that directly connects the crankshaft 18 with the input shaft 22 via a damper, not shown. A mechanical oil pump 21 such as a gear pump is connected to the pump impeller 20. This oil pump 21 is driven together with the pump impeller 20 by the engine 10 so as to generate hydraulic pressure used for shifting and lubrication and the like. The engine 10 is a driving power source for running a vehicle. The torque converter 12 is a fluid coupling which is capable of boosting torque.

The automatic transmission 14 includes a first planetary gearset 40, a second planetary gearset 42, and a third planetary gearset 46, all of which are of the single pinion type, and an output gear 48. The first planetary gearset 40 and second planetary gearset 42 are both provided on the same axis as the input shaft 22, with a carrier of the first planetary gearset 40 coupled to a ring gear of the second planetary gearset 42 and a carrier of the second planetary gearset 42 coupled to a ring gear of the first planetary gearset 40, such that the first planetary gearset 40 and second planetary gearset 42 together form a carrier-ring, carrier-ring (CR-CR) coupled planetary gearset. The third planetary gearset 46 is provided on the same axis as a countershaft 44 which is parallel with the input shaft 22. The output gear 48 is fixed to one end of the countershaft 44 and is meshed with the differential gear unit 16. The structural elements of the first planetary gearset 40, the second planetary gearset 42, and the third planetary gearset 46, i.e., a sun gear, a ring gear, and a carrier that rotatably supports planet gears that mesh with the sun gear and ring gear, can either be selectively coupled together by four clutches C0, C1, C2, and C3, or selectively coupled to the housing 28, which is a non-rotatable member, by three brakes B1, B2, and B3. Further, two one-way clutches F1 and F2 enable a carrier K2 and a sun gear S3, respectively, to either rotate in a given direction with respect to the housing 28, or engage with the housing 28. Because the differential gear unit 16 is symmetrical with respect to the axis of the drive axles, the bottom half thereof will be omitted.

The set of the first planetary gearset 40 and second planetary gearset 42 on the same axis as the input shaft 22, together with the clutches C0, C1, C2, the brakes B1 and B2, and the one-way clutch F1 make up a primary transmitting portion MG capable of four forward speeds and one reverse speed. The third planetary gearset 46 on the same axis as the countershaft 44, together with the clutch C3, the brake B3, and the one-way clutch F2 make up a secondary transmitting portion, i.e., an under drive portion U/D. In the primary transmitting portion MG, the input shaft 22 is coupled to i) the carrier K2 of the second planetary gearset 42 via the clutch C0, ii) a sun gear S1 of the first planetary gearset 40 via the clutch C1, and iii) a sun gear S2 of the second planetary gearset 42 via the clutch C2. A ring gear R1 of the first planetary gearset 40 is connected to the carrier K2 of the second planetary gearset 42, and a ring gear R2 of the second planetary gearset 42 is connected to a carrier K1 of the first planetary gearset 40. The sun gear S2 of the second planetary gearset 42 is coupled to the housing 28 via the brake B1. The ring gear R1 of the first planetary gearset 40 is coupled to the housing 28 via the brake B2. The one-way clutch F1 is provided between the carrier K2 of the second planetary gearset 42 and the housing 28. A first counter gear G1, which is fixed to the carrier K1 of the first planetary gearset 40, is in mesh with a second counter gear G2, which is fixed to a ring gear R3 of the third planetary gearset 46. In the underdrive portion U/D, a carrier K3 and the sun gear S3 of the third planetary gearset 46 are coupled together via the clutch C3. Also in the underdrive portion U/D, the brake B3 and the one-way clutch F2 are provided in parallel between the sun gear S3 and the housing 28.

The clutches C0, C1, C2, and C3 and the brakes B1, B2, B3 (hereinafter simply referred to as "clutches C" and "brakes B", respectively, when not specified further) are hydraulic friction devices, the clutches C being, for example, multi-disc clutches and the brakes B being multi-disc clutches or band brakes or the like which are applied by hydraulic actuators. These clutches C and brakes B are switched between an applied state and a released state, as shown in FIG. 2, for example, by switching solenoids S1 to S5 and linear solenoid valves SL1, SL2, and SLU of a hydraulic pressure control circuit 98 (see FIG. 3) between an energized state and a de-energized state, or by switching a hydraulic circuit using a manual valve, not shown. Each speed, i.e., five forward speeds, one reverse speed, and a neutral speed, is achieved according to a position of a shift lever 72 (see FIG. 3). The denotations "1st" to "5th" in FIG. 2 denote the first forward speed to the fifth forward speed, respectively. A single circle indicates an applied state of the clutches C and brakes B. An "X" indicates a released state of the clutches C and brakes B. A triangle indicates an applied state of the clutches C and brakes B only during driving. The shift lever 72 is operated in a shift pattern which includes a park position "P", a reverse drive position "R", a neutral position "N", and forward drive positions "D", "4", "3", "2", and "L", as shown in FIG. 4, for example. When the shift lever 72 is in the "P" or the "N" position, the transmission is in a neutral speed, i.e., a non-driving speed in which the transmission of power to the wheels is interrupted. When the shift lever 72 is in the "P" position, the driven wheels are mechanically prevented from rotating by a mechanical parking mechanism, not shown. Also, the five forward speeds and the one reverse speed achieved when the shift lever 72 is in any one of the forward drive positions, such as the "D" position, or the "R" position, respectively, correspond to driving speeds. Further, as shown in FIG. 2, a shift between second speed and third speed is a clutch-to-clutch or synchronous shift, in which the clutch C0 is applied at substantially the same time the brake B1 is released, or vice versa. Similarly, a shift between third speed and fourth speed is a clutch-to-clutch shift in which the clutch C1 is applied at substantially the same time the brake B1 is released, or vice versa. In the above-mentioned hydraulic friction device, a line pressure regulated by a turbine torque $T_T$, i.e., an input torque $T_{IN}$ of the automatic transmission 14, or a throttle opening amount $\theta_{TH}$ which is a value representative of the input torque $T_{IN}$, is used as the base pressure for the hydraulic friction devices.

Figure 3:
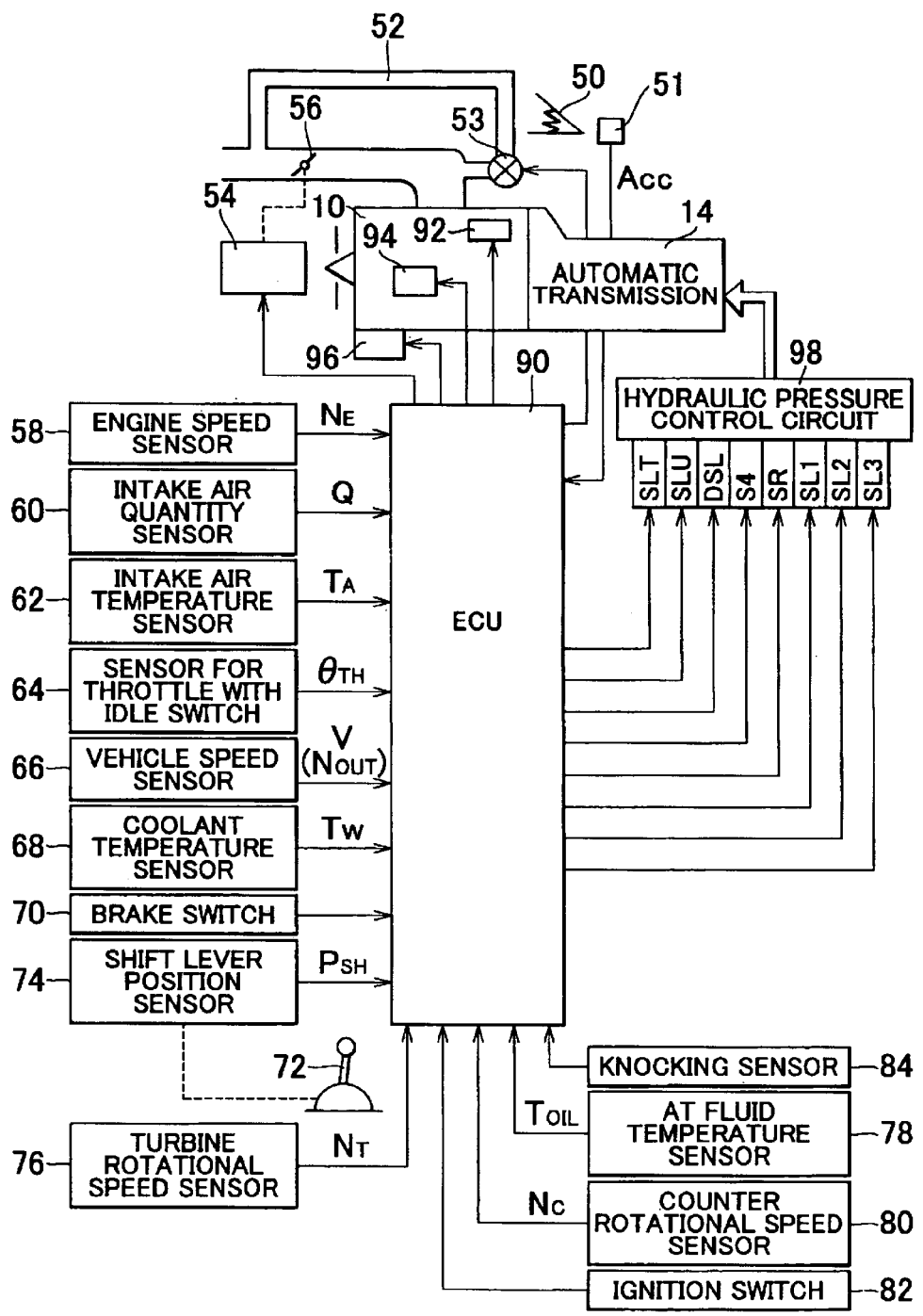
FIG. 3 is a block diagram of a control system, which shows the input and output to and from an ECU provided in the vehicle according to the first exemplary embodiment shown in FIG. 1.
Figure 4:
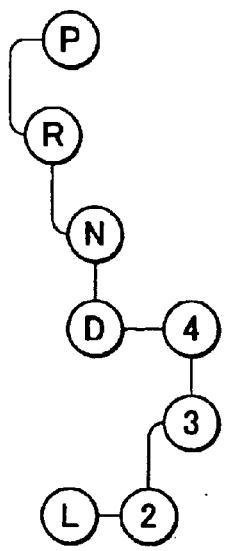
FIG. 4 is a view showing one example of a shift pattern of a shift lever shown in FIG. 3.
Figure 5:
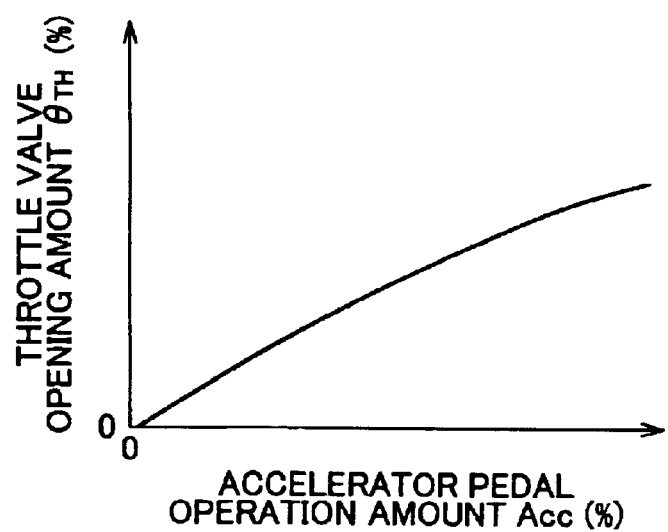
FIG. 5 is a graph showing one example of the relationship between an accelerator pedal operation amount $A_{CC}$ and a throttle valve opening amount $\theta_{TH}$ used in throttle control performed by the ECU shown in FIG. 3.

FIG. 3 is a block diagram illustrating a control system provided in a vehicle, which controls the engine 10 and automatic transmission 14 and the like shown in FIG. 1. According to this control system, the operation amount (accelerator opening amount) $A_{CC}$ of an accelerator pedal 50 is detected by an accelerator operation amount sensor 51. This accelerator pedal 50 corresponds to an accelerator operating member and can be depressed to a large degree depending on the amount of output required by a driver. The accelerator pedal operation amount $A_{CC}$ corresponds to the amount of required output. An electronic throttle valve 56 is provided in an intake pipe of the engine 10. A throttle actuator 54 changes the opening amount of this electronic throttle valve 56 so that it has an opening angle (opening amount) $\theta_{TH}$ (%) determined based on the accelerator pedal operation amount $A_{CC}$ from a pre-stored (i.e., preset) relationship shown in FIG. 5. This relationship is set such that the throttle opening amount $\theta_{TH}$ increases as the accelerator pedal operation amount $A_{CC}$ becomes larger. Also, in a bypass passage 52 which bypasses the electronic throttle valve 56 is provided an ISC (idle speed control) valve 53 that controls the intake air quantity when the electronic throttle valve 56 is fully closed in order to control an idle speed $N_{EIDL}$ of the engine 10.

In addition, other sensors and switches are also provided, such as an engine speed sensor 58 for detecting an engine speed $N_E$ of the engine 10, an intake air quantity sensor 60 for detecting an intake air quantity Q of the engine 10, an intake air temperature sensor 62 for detecting a temperature $T_A$ of the intake air, a throttle sensor 64 with an idle switch for detecting when the electronic throttle valve 56 is fully closed (i.e., when the engine 10 is in an idle state) as well as for detecting the opening amount $\theta_{TH}$ of that electronic throttle valve 56, a vehicle speed sensor 66 for detecting a rotational speed $N_{OUT}$ of the countershaft 44 which corresponds to the vehicle speed V, a coolant temperature sensor 68 for detecting a coolant temperature $T_W$ of the engine 10, and a brake switch 70 for detecting whether a foot brake is being operated. In addition, other sensors and switches provided include a lever position sensor 74 for detecting a lever position (i.e., an operating position) $P_{SH}$ of the shift lever 72, a turbine rotational speed sensor 76 for detecting a turbine rotational speed $N_T$ (=rotational speed $N_{IN}$ of the input shaft 22), an AT fluid sensor 78 for detecting an AT fluid temperature $T_{OIL}$, which is the temperature of the hydraulic fluid within the hydraulic pressure control circuit 98, a counter rotational speed sensor 80 for detecting a rotational speed $N_C$ of the first counter gear G1, an ignition switch 82, and a knock sensor 84. Signals from these sensors indicative of the engine speed $N_E$, intake air quantity Q, intake air temperature $T_A$, throttle valve opening amount $\theta_{TH}$, vehicle speed V, engine coolant temperature $T_W$, a brake operation, lever position $P_{SH}$ of the shift lever 72, turbine rotation speed $N_T$, AT fluid temperature $T_{OIL}$, counter rotational speed $N_C$, the operational position of the ignition switch 82, and knocking of the engine 10 and the like are supplied to an electronic control unit (ECU) 90. The brake switch 70 is an ON-OFF switch that switches the brake on or off depending on whether the brake pedal, which operates a main brake, is depressed or not.

Figure 6:
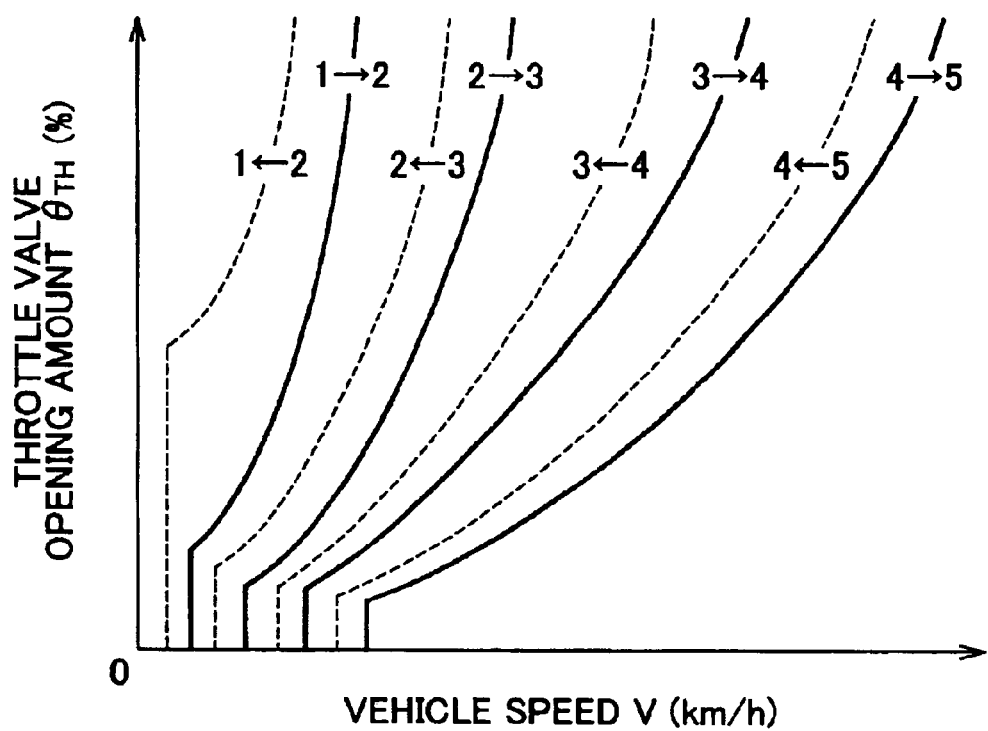
FIG. 6 is a view showing a shift diagram (i.e., shift map) used in shift control of the automatic transmission performed by the ECU shown in FIG. 3.

The ECU 90 includes a microcomputer that has a CPU, RAM, ROM, an input/output interface and the like. The CPU controls the output of the engine 10 and the shifting of the automatic transmission 14 and the like by processing signals according to a program stored in the ROM beforehand while using the temporary storage function of the RAM. When necessary, the CPU may be configured such that a portion thereof for engine control is separate from a portion thereof for shift control. The output of the engine 10 is controlled by controlling the electronic throttle valve 56 open and closed with the throttle actuator 54, controlling a fuel injection valve 92 in order to control the fuel injection quantity, controlling an ignition device 94, such as an igniter, in order to control the ignition timing, and controlling the ISC valve 53 in order to control the idle speed. The electronic throttle valve 56 is controlled by, for example, driving the throttle actuator 54 based on the actual accelerator pedal operation amount $A_{CC}$ according to the relationship between the accelerator pedal operation amount $A_{CC}$ and the throttle valve opening amount $\theta_{TH}$, shown in FIG. 5 for example, and increasing the throttle valve opening amount $\theta_{TH}$ as the accelerator pedal operation amount $A_{CC}$ increases. When the engine 10 is started, the crankshaft 18 is cranked by a starter (i.e., an electric motor) 96. Further, in the shift control of the automatic transmission 14, the CPU 90 first determines the speed that the automatic transmission 14 should shift into from the current speed based on the actual throttle valve opening amount $\theta_{TH}$ and the vehicle speed V according to a pre-stored shift diagram (i.e., shift map), shown in FIG. 6, for example. The CPU 90 then outputs a shift command for starting a shift operation to shift the automatic transmission 14 from the current speed to the determined speed. The ECU 90 also switches solenoids S4 and SR of the hydraulic pressure control circuit 98 on (energized) and off (de-energized) and continually changes the energized state of the linear solenoid valves SL1, SL2, and SL3 and the like of the hydraulic pressure control circuit 98 by duty control or the like, so that shift shock due to a change in driving force or the like will not occur and the durability of the friction members will not reduced. In FIG. 6, the solid lines are upshift lines and the broken lines are downshift lines. The automatic transmission 14 shifts into a speed on the low speed side having a large gear ratio (=input rotational speed $N_{IN}$/output rotational speed $N_{OUT}$) as the vehicle speed V decreases or the throttle valve opening amount $\theta_{TH}$ increases. Denotations "1" through "5" in the drawing refer to the first speed "1st" through the fifth speed "5th".

Figure 7:
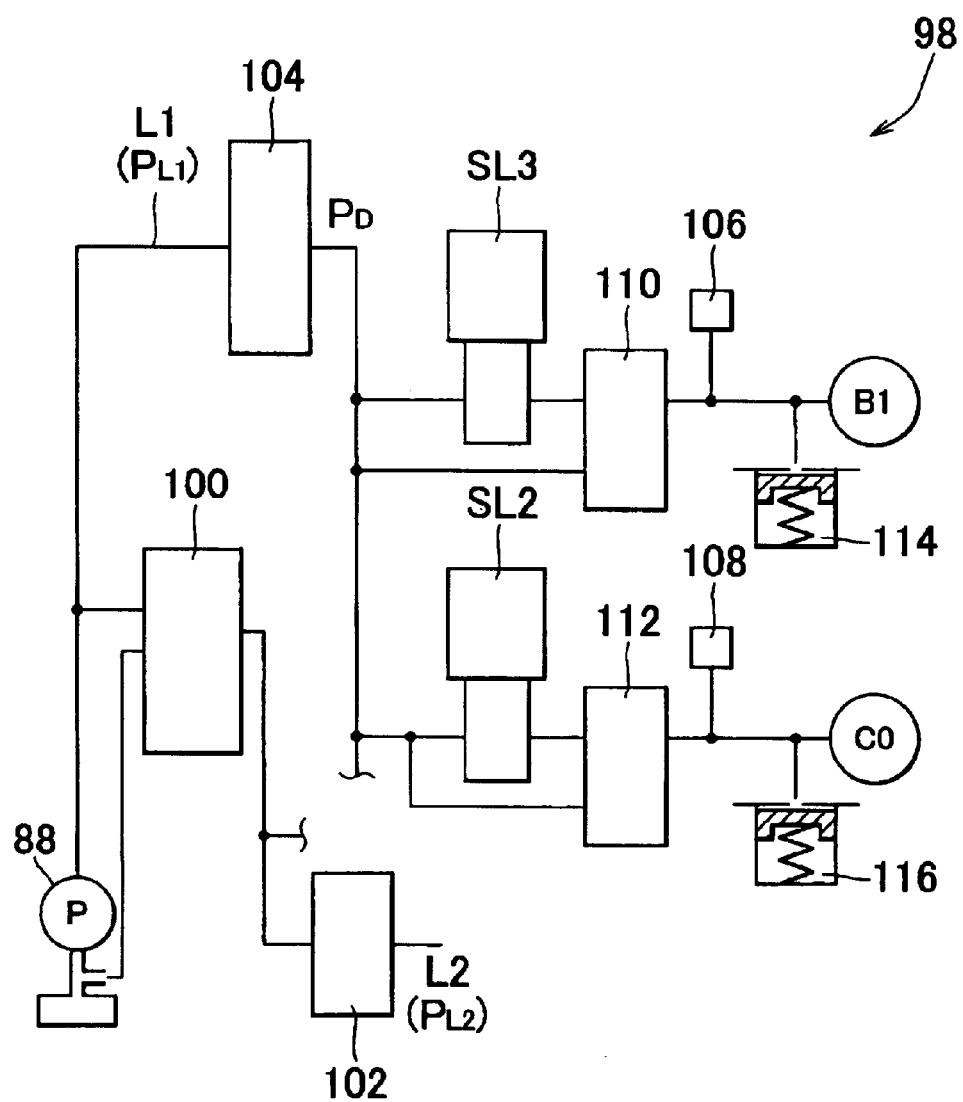
FIG. 7 is a diagram illustrating main portions of a hydraulic pressure control circuit shown in FIG. 3.

FIG. 7 is a functional block diagram illustrating main portions of the hydraulic pressure control circuit 98 that are related to a 3→2 downshift. The hydraulic fluid pressure-fed from the hydraulic pump 88 is regulated by a first regulator valve 100, which is a relief valve, so as to become a first line hydraulic pressure $P_{L1}$. The hydraulic fluid flowing out through the first regulator valve 100 is then regulated by a second regulator valve 102, which is also a relief valve, so as to become a second line hydraulic pressure $P_{L2}$. The first line hydraulic pressure $P_{L1}$ is supplied via a hydraulic line L1 to a manual valve 104 which is connected to the shift lever 72. When the shift lever 72 is shifted into either the D position (i.e., range) or the S position (i.e., range), a forward position pressure $P_D$ which is equal to the first line hydraulic pressure $P_{L1}$ is supplied from the manual valve 104 to each solenoid valve SL1, SL2, SL3, and the like, as well as to a shift valve, not shown. FIG. 7 shows the clutch C0 which is released to achieve the 3→2 downshift, the brake B1 which is applied to achieve the 3→2 downshift, the linear solenoid valve SL3 used to directly control the apply pressure $P_{B1}$ of the brake B1, the linear solenoid valve SL2 used to directly control the apply pressure $P_{C0}$ of the clutch C0, a hydraulic pressure sensor 106 connected to the brake B1 for detecting the apply pressure $P_{B1}$, a hydraulic pressure sensor 108 connected to the clutch C0 for detecting the apply pressure $P_{C0}$, a B1 clutch control valve 110 for regulating the apply pressure $P_{B1}$ while the hydraulic fluid is being supplied, a C0 clutch control valve 112 for regulating the apply pressure $P_{C0}$ while the hydraulic fluid is being supplied, a B1 accumulator 114 for reducing an increase in the apply pressure $P_{B1}$ of the brake B1, and a C0 accumulator 116 for reducing an increase in the apply pressure $P_{C0}$ of the clutch C0.

Figure 8:
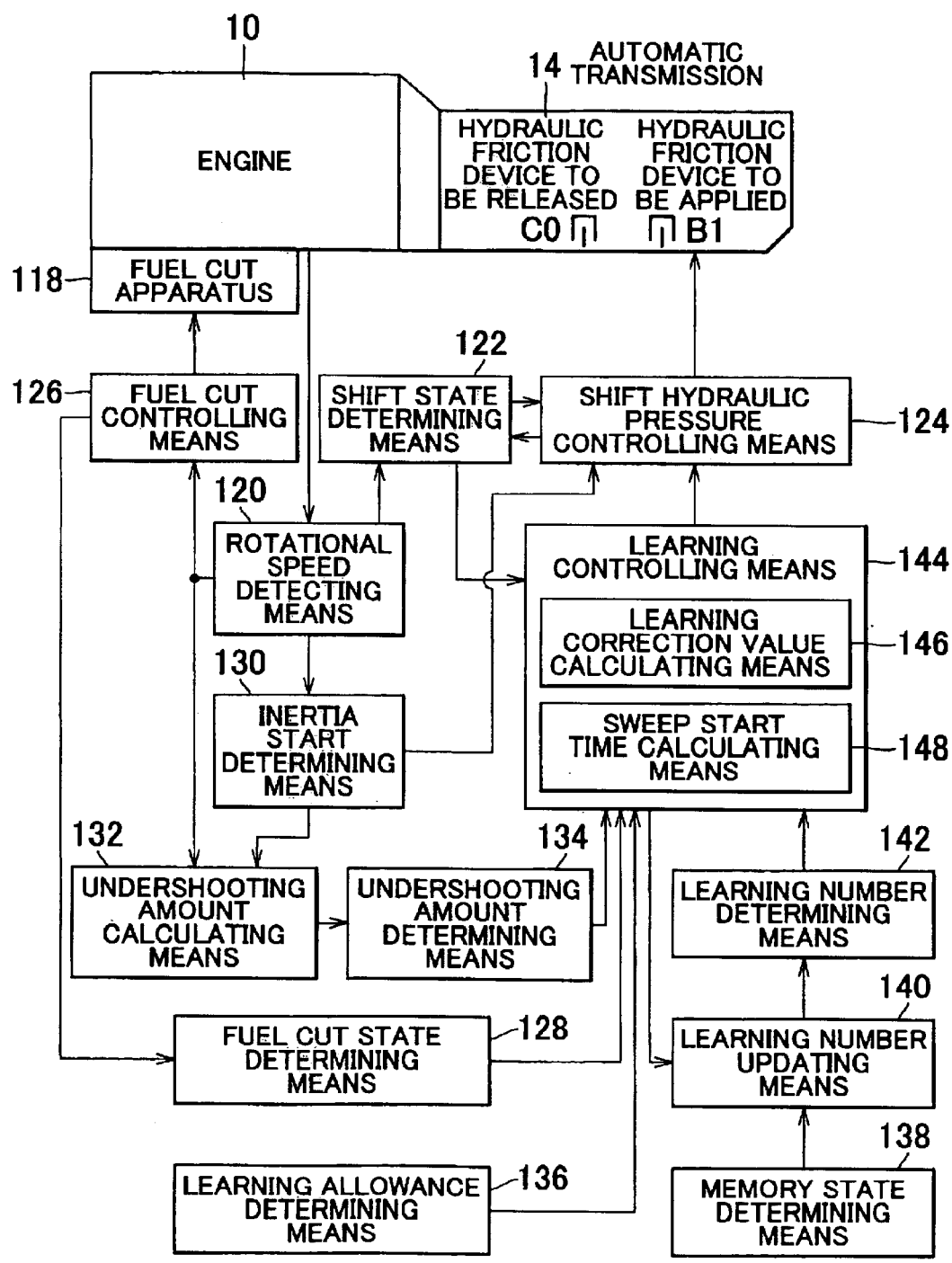
FIG. 8 is a functional block diagram illustrating a major part of a control function of the ECU shown in FIG. 3, i.e., a shift control operation of the automatic transmission.
Figure 9:
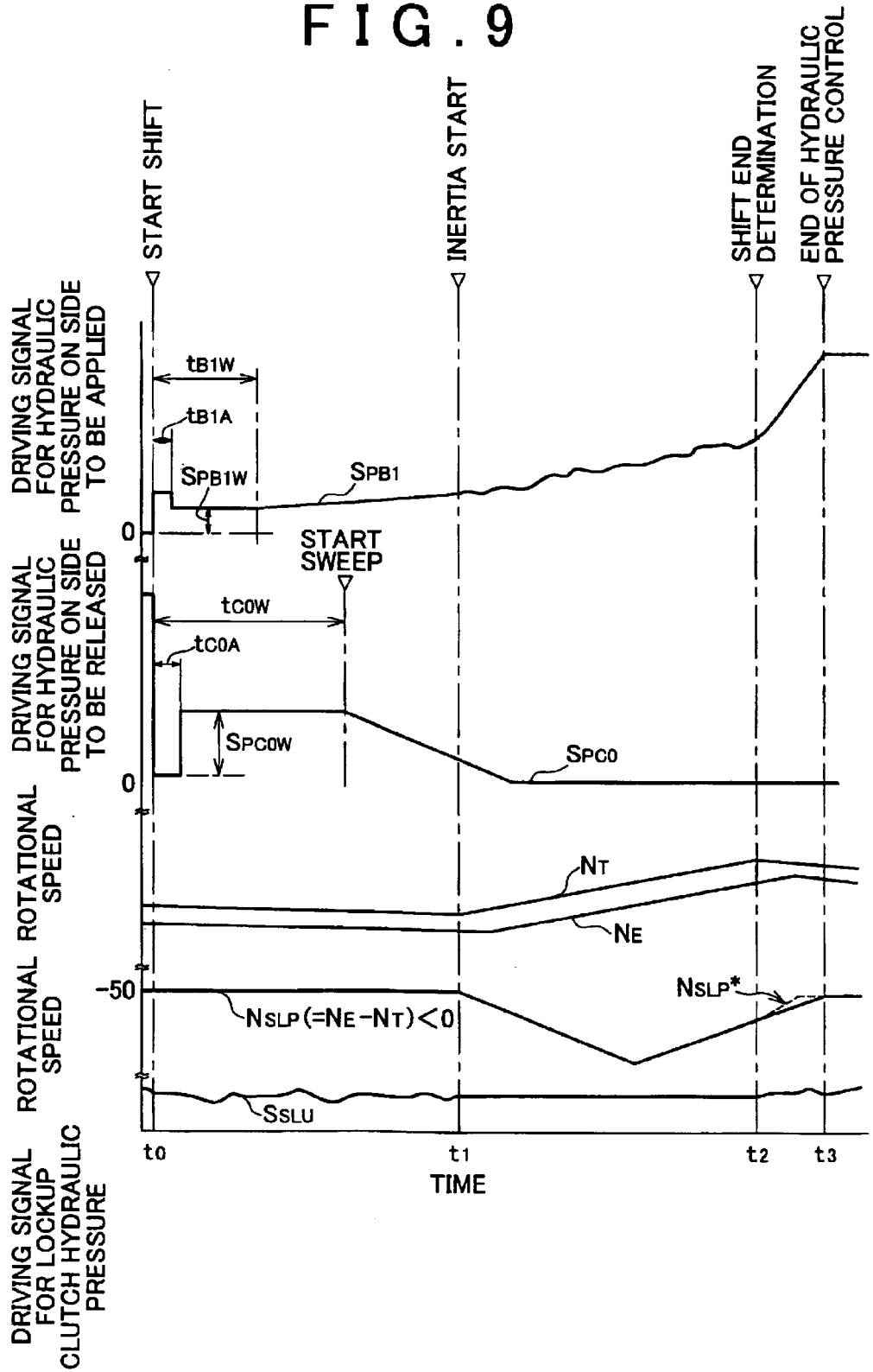
FIG. 9 is a time chart showing a major part of the control function of the ECU shown in FIG. 3, i.e., a basic control operation for a clutch-to-clutch downshift of the automatic transmission.

FIG. 8 is a functional block diagram illustrating a major part of a control function of the ECU 90, i.e., a shift control operation of the automatic transmission 14. FIG. 9 is a time chart illustrating a basic control operation for a clutch-to-clutch downshift of the automatic transmission 14. The state of the vehicle during this basic control operation is one in which a fuel cut operation (i.e., fuel supply to the engine 10 is cut off) by the fuel cut apparatus 118 that is executed when the engine speed $N_E$ is greater than a preset fuel cut lower limit speed (i.e., a fuel cut cancellation value $C_F$) when the accelerator pedal is not being depressed and the vehicle is decelerating, is in effect, such as when a clutch-to-clutch downshift control operation such as a 3→2 downshift is being performed, for example. Referring back to FIG. 8, rotational speed detecting means 120 detects the turbine rotational speed $N_T$ (=rotational speed $N_{IN}$ of the input shaft 22) from a signal from the turbine rotational speed sensor 76, for example, and also detects the engine speed $N_E$ of the engine 10 from a signal from the engine speed sensor 58, for example. Inertia start determination means 130 determines (at time $t_1$) whether the turbine rotational speed $N_T$ has started to increase following the shift to a low speed (e.g., second speed) during the downshift control operation while the vehicle is decelerating.

Shift state determining means 122 determines (at time $t_0$) whether a shift (i.e., hydraulic pressure control) of the automatic transmission 14 has started based on a signal output from the shift hydraulic pressure controlling means 124, which will be described later. The shift state determining means 122 then determines (at time $t_2$) whether the shift is complete based on whether or not the turbine rotational speed $N_T$ substantially matches a rotational speed $\gamma 2 \times N_{OUT}$ calculated from the rotational speed $N_{OUT}$ of the counter-shaft 44 detected by the vehicle speed sensor 66 and the gear ratio $\gamma 2$ of the speed (e.g., second speed) after the shift is complete. The shift state determining means 122 then determines (at time $t_3$) whether the shift hydraulic pressure control performed by the shift hydraulic pressure controlling means 124 has ended based on whether the apply pressure $P_{B1}$ detected by the hydraulic pressure sensor 106 which is connected to the brake B1 has reached the maximum value such that the brake B1 is fully applied. Also, fuel cut controlling means 126 determines whether it is necessary to supply fuel to the engine 10 based on the engine speed $N_E$ and the accelerator pedal operation amount $A_{CC}$ and the like, and outputs a command to the fuel cut apparatus 118 to cut off the supply of fuel to the engine 10 depending on that determination. For example, when the vehicle is decelerating, during which the accelerator pedal operation amount $A_{CC}$ is zero, but the engine speed $N_E$ of the engine 10 is not below a predetermined value (i.e., a fuel cut cancellation value $C_F$), a fuel cut command is output so that a fuel cut is performed. When the engine speed $N_E$ of the engine 10 slows to the predetermined value, the fuel cut command stops being output so that the fuel cut is stopped, i.e., the fuel cut is cancelled. Fuel cut state determining means 128 determines whether the fuel cut has been cancelled based on a signal output to the fuel cut controlling means 126.

When the speed into which the automatic transmission 14 should be shifted from the current speed is determined based on the actual throttle valve opening $\theta_{TH}$ and the vehicle speed V from the shift diagram (i.e., the shift map) shown in FIG. 6, which is stored beforehand, for example, the shift hydraulic pressure controlling means 124 outputs a signal to the hydraulic pressure control circuit 98 to change the apply pressure of the hydraulic friction device so as to switch the automatic transmission 14 from the current speed to the other speed. For example, during the 3→2 clutch-to-clutch downshift as shown in FIG. 9, an apply driving signal $S_{PB1}$ is output to the linear solenoid valve SL3 which directly controls the apply pressure $P_{B1}$ of the brake B1, which is a hydraulic friction device to be applied, and a release driving signal $S_{PC0}$ is output to the linear solenoid valve SL2 which directly controls the apply pressure $P_{C0}$ of the clutch C0, which is a hydraulic friction device to be released. The apply driving signal $S_{PB1}$ will now be described. First, a signal $S_{PB1W}$ is output to keep the apply pressure $P_{B1}$ at a constant predetermined apply pressure $P_{B1W}$ which is set lower than the pressure at which the brake B1 starts to be applied during the time $t_{B1W}$ from the shift starting point $t_0$. After the apply pressure $P_{B1}$ is kept at the constant pressure, a signal is then output to smoothly increase it at a preset constant rate until it has been determined by the inertia start determining means 130 that inertia has started (time $t_1$). Next, a signal to smoothly change the apply pressure $P_{B1}$ is output for feedback control so that the rotational speed $N_{IN}$ of the input shaft (i.e., the turbine rotational speed $N_T$) smoothly increases at a predetermined constant rate from time $t_1$ until it has been determined by the shift state determining means 122 that the shift is complete (time $t_2$). A signal is then output to rapidly increase the apply pressure $P_{B1}$ from time $t_2$ so as to fully apply the brake B1 (time $t_3$). Here, during time $t_{B1A}$ from the start of the shift, a signal that is larger than the signal $S_{PB1W}$ is output to quickly increase the apply pressure $P_{B1}$ to the predetermined apply pressure $P_{B1W}$ during time $t_{B1W}$.

Next, the release driving signal $S_{PC0}$ will be described. First, a signal $S_{PC0W}$ is output for keeping the apply pressure $P_{C0}$ at a constant predetermined apply pressure (i.e., a holding pressure) $P_{C0W}$ during time $t_{C0W}$. This predetermined apply pressure $P_{C0W}$ is set lower than the maximum apply pressure, which is the first line hydraulic pressure $P_{L1}$, i.e., the base pressure before the start of the shift or the originally supplied hydraulic pressure, and slightly higher than the pressure at which the clutch C0 starts to be released. After the apply pressure $P_{C0}$ is kept at the constant pressure, a signal is then output to smoothly decrease (hereinafter, this smooth decrease is also referred to as "sweep") it at a constant rate so as to fully release the clutch C0. Here, during time $t_{C0A}$ after the start of the shift, a signal to fully release the clutch C0 is output to quickly decrease the apply pressure $P_{C0}$ to the predetermined apply pressure $P_{C0W}$ during time $t_{C0W}$ after the start of the shift. The time $t_{C0W}$ is a holding time for the holding pressure, during which the apply pressure $P_{C0}$ is maintained at the constant predetermined pressure $P_{C0W}$. Because the time $t_{C0W}$ is also the time from the start of the shift until the apply pressure $P_{C0}$ starts to be smoothly changed (decreased), i.e., because the time $t_{C0W}$ is also the time from the start of the shift until the apply pressure $P_{C0}$ starts to be gradually decreased (i.e., until the start of sweep), time $t_{C0W}$ also denotes the time until the start of sweep control (i.e., the time before starting to decrease the pressure).

Figure 14:
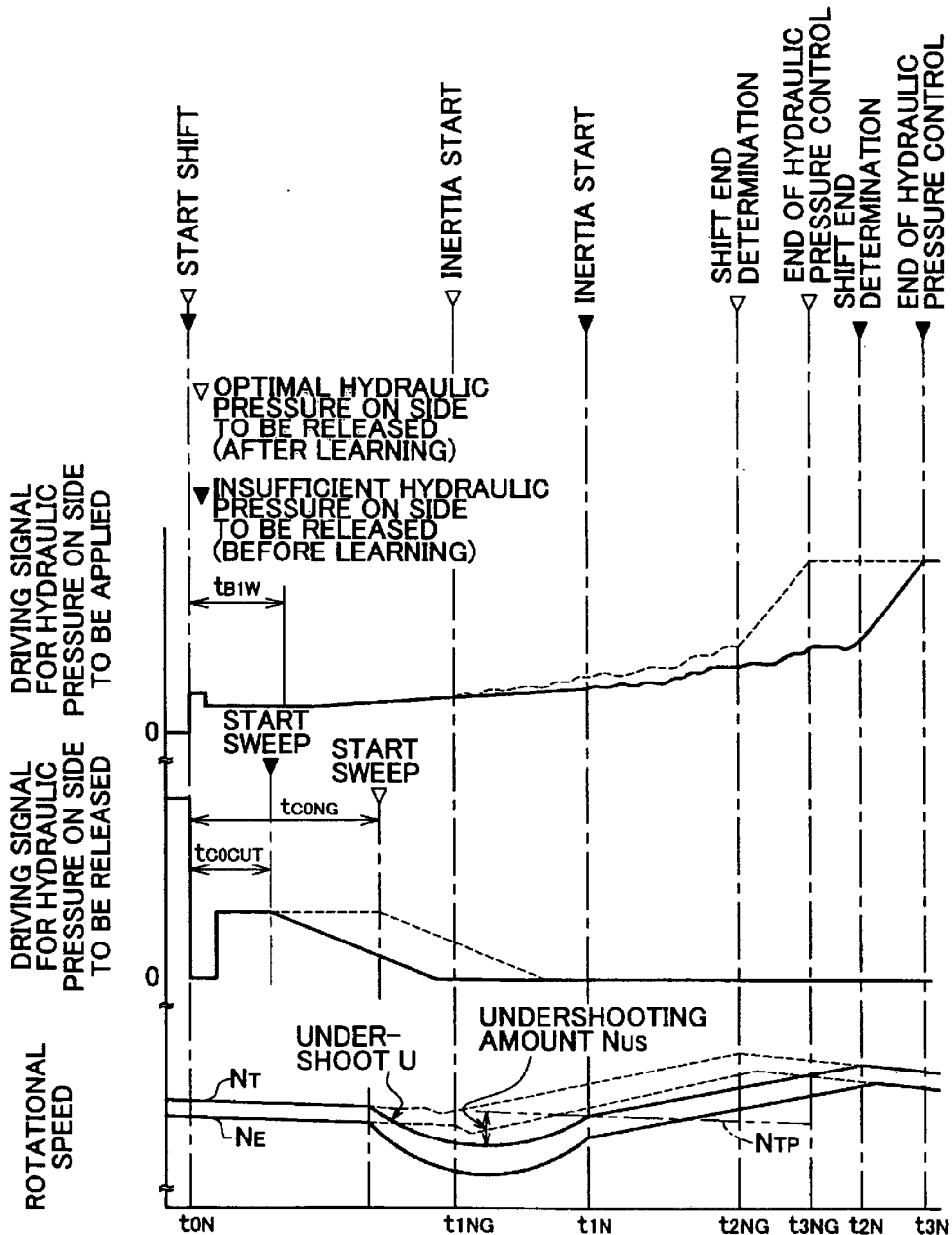
FIG. 14 is a time chart illustrating a case in which a normal learning routine or a high speed learning routine for a neutral tendency is executed in a major part of the control function of the ECU shown in FIG. 3, i.e., in the shift control operation of the automatic transmission during a downshift while the vehicle is decelerating.

Accordingly, when there is only a small degree of overlap between the application of the clutch C0 and the application of the brake B1, for example, when the time until the start of sweep control $t_{C0W}$ is short, when, during the 3→2 clutch-to-clutch downshift while the vehicle is decelerating, the shift hydraulic pressure controlling means 124 decreases the apply pressure $P_{C0}$ of the clutch C0, which is the hydraulic friction device to be released, while simultaneously increasing the apply pressure $P_{B1}$ of the brake B1, which is the hydraulic friction device to be applied, there is a tendency for driving wheels (not shown) and the input shaft 22 become in a disconnected state, i.e., a neutral state, (hereafter referred to as "neutral tendency") resulting in a momentary drop in both the turbine rotational speed $N_T$ and the engine speed $N_E$ (hereinafter referred to as "undershooting"; see FIG. 14). As a result, shift shock (a phenomenon resembling momentary engine brake) may occur when the engine speed $N_E$ increases due to application of the brake B1 and the shift time may increase. Further, if the neutral tendency continues, the amount of undershooting of the engine speed $N_E$ may increase to the extent that the fuel cut operation by the fuel cut controlling means 126 is cancelled, which may reduce the improvement in fuel efficiency achieved by the fuel cut. In contrast, when there is a large degree of overlap between the application of the clutch C0 and the application of the brake B1, for example, when the time until the start of sweep control $t_{C0W}$ is long, the automatic transmission 14 may temporarily lock up and become in a tie-up state in which the torque of the output shaft of the automatic transmission 14 suddenly decreases temporarily, resulting in shift shock and leading to degradation of the hydraulic friction devices of the automatic transmission 14. In this exemplary embodiment, the time until the start of sweep control $t_{C0W}$ is sequentially changed to the optimum value according to a repeated learning correction routine so that the neutral tendency and tie-up will not occur.

In this exemplary embodiment, lockup clutch slip controlling means, not shown, is also provided which outputs a driving signal $S_{SLU}$ for the solenoid valve SLU that controls an apply pressure $P_{LU}$ of the lockup clutch 32 in order to control a rotational speed difference $N_{SLP}$ $(=N_E-N_T)$ between the turbine rotational speed $N_T$ and the engine speed $N_E$ to a target rotational speed difference $N_{SLP}{}^*$. From time $t_0$ to time $t_1$, the turbine rotational speed $N_T$ and engine speed $N_E$ gradually decrease as the vehicle decelerates, with the rotational speed difference $N_{SLP}$ being made to substantially match the target rotational speed difference $N_{SLP}{}^*$, e.g., −50 rpm, by the driving signal $S_{SLU}$ for the solenoid value SLU. From time $t_1$ to time $t_2$, the turbine rotational speed $N_T$ starts to increase as the brake B1 is applied. The rate of this increase is controlled so as to be substantially constant by feedback control with the apply pressure $P_{B1}$ of the brake B1. At this time, the driving signal $S_{SLU}$ for the solenoid valve SLU is constant so the engine speed $N_E$ increases along with the turbine rotational speed $N_T$, but for a slightly longer time. Further, from time $t_2$ to time $t_3$, the turbine rotational speed $N_T$ changes to a speed corresponding to the vehicle speed as the shift ends, and the rotational speed difference $N_{SLP}$ is again made to substantially match the target rotational speed difference $N_{SLP}{}^*$, e.g., −50 rpm, by feedback control using the driving signal $S_{SLU}$ for the solenoid valve SLU.

In the downshift control operation (see FIG. 14), undershooting amount calculating means 132 calculates an undershooting amount $N_{US}$ of the turbine rotational speed $N_T$ generated when there is little overlap between the application of the clutch C0 and the application of the brake B1, i.e., when the neutral tendency exists, according to the difference (i.e., $N_{US}=N_{TP}-N_T$) between an estimated turbine rotational speed $N_{TP}$ $(=\gamma_3 \times N_{OUT})$ derived from the rotational output $N_{OUT}$ of the countershaft 44 and the gear ratio $\gamma_3$ of the speed before the shift (e.g., third speed), and the actual turbine rotational speed $N_T$. A maximum undershooting amount $N_{USMAX}$ is then obtained by consecutive comparisons with the size of this undershooting amount $N_{US}$. More specifically, the maximum undershooting amount $N_{USMAX}$ is calculated by first initializing (i.e., resetting) the value thereof to zero and then comparing the sizes of the maximum undershooting amount $N_{USMAX}$ and the undershooting amount $N_{US}$. If the undershooting amount $N_{US}$ is larger, that value replaces the maximum undershooting amount $N_{USMAX}$. The subsequent maximum undershooting amount $N_{USMAX}$ and the undershooting amount $N_{US}$ are compared again and the larger value is used as the maximum undershooting amount $N_{USMAX}$. Then undershooting amount determining means 134 determines whether the actual maximum undershooting amount $N_{USMAX}$ is equal to, or greater than, a target undershooting amount $N_{USU}$, which is a first predetermined value, based on shift shock and the shift time and the like, or whether the actual maximum undershooting amount $N_{USMAX}$ is equal to, or less than, an allowable undershooting amount $N_{USD}$, which is a second predetermined value lower than the first predetermined value, based on shift shock and the shift time and the like. The target undershooting amount $N_{USU}$ is a so-called upper limit value for the region of the maximum undershooting amount $N_{USMAX}$ which is to be the target. If the actual maximum undershooting amount $N_{USMAX}$ exceeds this value, the neutral tendency increases. Also, the allowable undershooting amount $N_{USD}$ is a so-called lower limit value for the region of the maximum undershooting amount $N_{USMAX}$ which is to be the target. If the actual maximum undershooting amount $N_{USMAX}$ falls below this value, there is a tendency for tie-up to occur.

Learning allowance determining means 136 determines whether a condition to start a learning correction routine is fulfilled in the learning correction routine at the time until the start of sweep control $t_{COW}$. For example, the learning allowance determining means 136 determines whether the AT fuel temperature $T_{OIL}$ and the coolant temperature $T_W$ of the engine 10 and the like are stable, whether the various sensors, such as the AT fluid temperature sensor 78 and the coolant temperature sensor 68, or the turbine rotational speed sensor 76 and the like, are operating normally, and whether the shift is a single shift such as a 3→2 downshift. Memory state determining means 138 determines whether the learning correction routine was executed when EPROM such as EEPROM (electrically erasable programmable read-only memory) in which is stored, for example, a learning correction value L for the time until the start of sweep control $t_{COW}$, was in its initial state, or after its memory was initialized (i.e., cleared). The initial state of the EEPROM is that of when it is either initially installed or replaced in the vehicle and the learning correction routine has not yet been performed.

Learning number updating means 140 updates a learning number n by adding 1 to the last learning number n stored in the EEPROM when the learning correction routine is executed during the time until the start of sweep control $t_{COW}$, for example, and then stores that updated learning number n. Also, in the first learning correction routine when the EEPROM is in the initial state or after its memory has been initialized (i.e., cleared), the learning number n is updated so that n=0 and that updated learning number n is then stored in memory. Learning number determining means 142 determines whether the normal learning routine may be executed by determining, for example, whether the learning number n of the learning correction routine for the time until the start of sweep control $t_{COW}$ exceeds a predetermined number $n_C$. This is because, although the time until the start of sweep control $t_{COW}$ is consecutively changed to the optimal value by repeating the learning correction routine, when the learning number n is small, dispersion in the maximum undershooting amount $N_{USMAX}$ due to deviation among vehicles is unavoidable, so a learning correction routine different from the normal learning correction routine that is performed when the learning number n is large, for example, changing the coefficient to be multiplied by the maximum undershooting amount $N_{USMAX}$, is necessary in order to quickly reflect the learning correction value L in the next shift control operation. The predetermined number $n_C$ is therefore set to 2 to 5, for example.

Learning controlling means 144 is provided with learning correction value calculating means 146 and sweep start time calculating means 148. The learning controlling means 144 sequentially changes the time until the start of sweep control $t_{COW}$ of the release driving signal $S_{PC0}$ output to the linear solenoid valve SL2 that directly controls the apply pressure $P_{C0}$ of the clutch C0, which is the hydraulic friction device to be released, to the optimal value by repeating the learning correction routine so that the turbine rotational speed $N_T$ will not drop and tie-up will not occur. This learning controlling means 144 prevents the turbine rotational speed $N_T$ from dropping and tie-up from occurring by keeping the apply driving signal $S_{PB1}$ output to the linear solenoid valve SL3 that directly controls the apply pressure $P_{B1}$ of the brake B1, which is the hydraulic friction device to be applied, constant each time and executing the learning control routine only for the time until the start of sweep control $t_{COW}$ of the release driving signal $S_{PC0}$.

When it is determined by the undershooting amount determining means 134 that the drop in the turbine rotational speed $N_T$ is large, the learning correction value calculating means 146 calculates the learning correction value L according to the fuel cut state determined by the fuel cut state determining means 128 in order to avoid the neutral tendency. If the fuel cut is still in effect, a new learning correction value $L_{NCUT}$ (=$L_C$+G×$N_{USMAX}$) is obtained by adding the product of the maximum undershooting amount $N_{USMAX}$ and a coefficient G (gain) to the current learning correction value $L_C$. The gain G is a value determined beforehand in order to reflect the maximum undershooting amount $N_{USMAX}$ in the new learning correction value $L_{NCUT}$. The gain G becomes a normal learning gain $G_F$ if the learning number n exceeds the predetermined number $n_C$, and becomes a high speed learning gain $G_K$ if the learning number does not exceed the predetermined number $n_C$. The high speed learning gain $G_K$ is a value larger than the normal learning gain $G_F$ so that the learning correction value L is quickly reflected in the next shift control operation. Also, because the time until the start of sweep control $t_{COW}$ when the fuel cut has been cancelled is shorter than it is during normal learning, the apply pressure $P_{C0}$ of the clutch C0, which is the hydraulic friction device to be released, is quickly reduced so the neutral tendency exists for longer and an undershooting amount $N_{EUS}$ of the engine speed $N_E$ becomes larger. Accordingly, for the purpose of improving fuel efficiency and the like as well, it is necessary to make the undershooting amount $N_{EUS}$ an amount in which the fuel cut will not be cancelled in the fewest number of times possible. Therefore, instead of calculating using the normal learning, a new learning correction value $L_{NCAN}$ (=$L_C$+$L_{NE}$) is obtained by adding a learning correction value for emergency neutral avoidance learning $L_{NE}$ to the current learning correction value $L_C$. The value of the maximum undershooting amount $N_{USMAX}$ calculated from the undershooting amount $N_{US}$ will not be a correct maximum value because the fuel cut has been cancelled and the engine speed $N_E$ has increased. Therefore, a predetermined value, not the product of the maximum undershooting amount $N_{USMAX}$ and the gain G used during normal learning and the like, is used as the value of the learning correction value for emergency neutral avoidance learning $L_{NE}$.

When the undershooting amount determining means 134 determines that there is a tie-up tendency, as well as determines whether the maximum undershooting amount $N_{USMAX}$ is equal to, or less than, a preset zero determination value in which factors such as noise from, and the precision of, the apparatus have been appropriately considered, i.e., determines whether the maximum undershooting amount $N_{USMAX}$ is a small value substantially equal to zero, the learning correction value calculating means 146 calculates the learning correction value L in order to avoid tie-up. When the maximum undershooting amount $N_{USMAX}$ is not equal to, or less than, the zero determination value, the undershooting amount $N_{US}$ or $N_{EUS}$ of the turbine rotational speed $N_T$ or the engine speed $N_E$ are generated to some extent, but the state of the automatic transmission 14 is close to tie-up so a new learning correction value $L_{TU}$ (=$L_C$-$L_{TF}$) is obtained by subtracting a learning correction value for normal learning $L_{TF}$ from the current learning correction value $L_C$ so as to shorten the time until the start of sweep control $t_{COW}$ in order to quickly reduce the apply pressure $P_{C0}$ of the clutch C0, which is the hydraulic friction device to be released. When the maximum undershooting amount $N_{USMAX}$ is equal to, or less than, the zero determination value, the automatic transmission 14 is in the tie-up state so a new learning correction value $L_{TT}$ (=$L_C$-$L_{TE}$) is obtained by subtracting a learning correction value for emergency tie-up avoidance learning $L_{TE}$ from the current learning correction value $L_C$ so that the time until the start of sweep control $t_{COW}$ becomes shorter than that for normal learning with one execution of the learning correction routine in order to quickly avoid shift shock. A predetermined value is used for the learning correction value for normal learning $L_{TF}$ or the learning correction value for emergency tie-up avoidance learning $L_{TE}$.

The sweep start time calculating means 148 calculates a next time until the start of sweep control $t_{CONEXT}$ (=$t_{COC}$+$L_{NEW}$) of the apply pressure $P_{C0}$ of the clutch C0 by adding a new learning correction value $L_{NEW}$ ($L_{NCUT}$, $L_{NCAN}$, $L_{TU}$ or $L_{TT}$) obtained by the learning correction value calculating means 146 to the current time until the start of sweep control $t_{COC}$. The new learning correction value $L_{NEW}$ is calculated by the learning correction value calculating means 146 such that $L_{NCAN}$>$L_{NCUT}$>0 in order to increase the current time until the start of sweep control $t_{COC}$ when there is a neutral tendency, and such that $L_{TT}$<$L_{TU}$<0 in order to reduce the current time until the start of sweep control $t_{COC}$ when there is a tie-up tendency.

Figure 10:
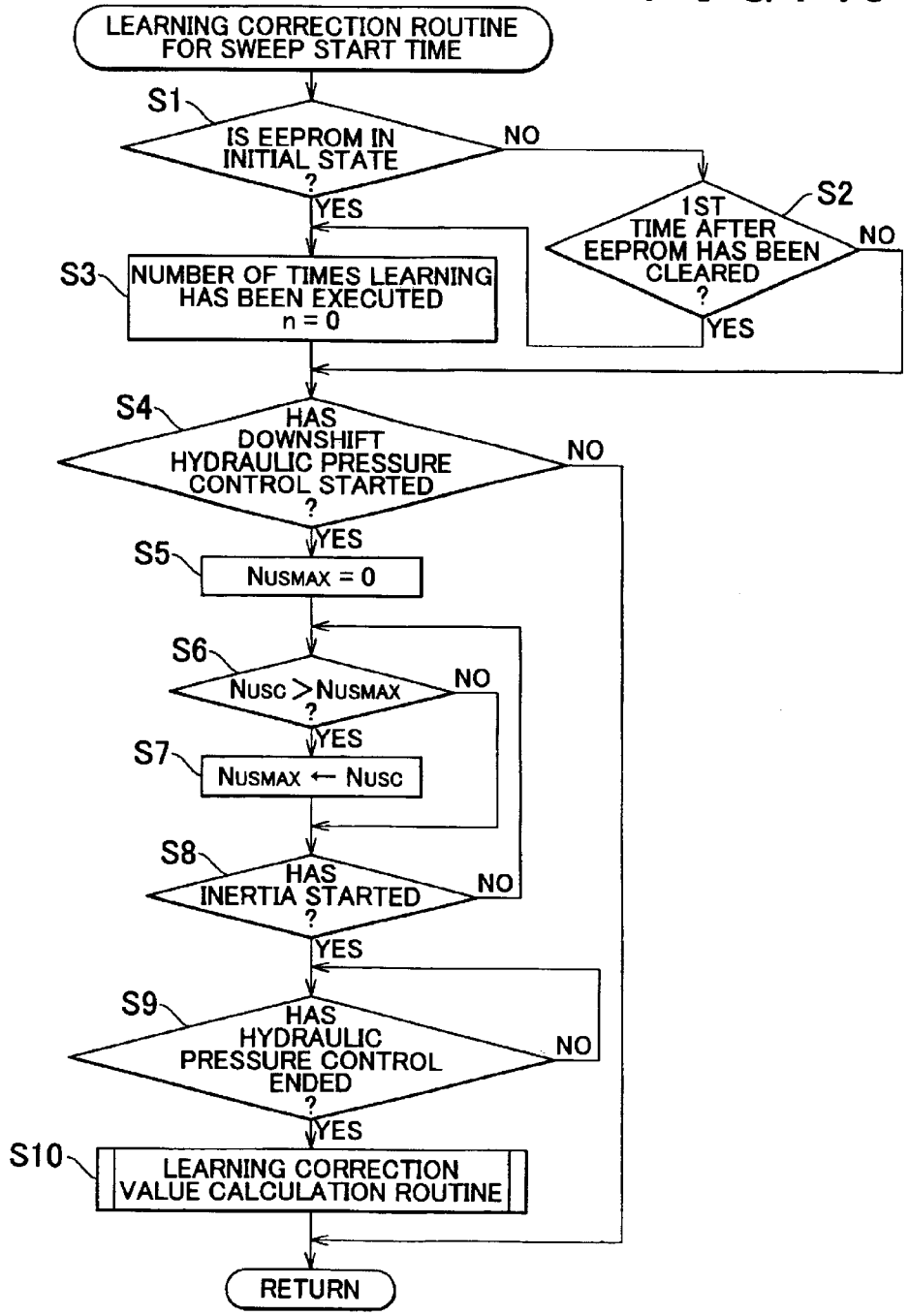
FIG. 10 is a flowchart of a main routine for illustrating a learning correction routine of a time until the start of sweep control of a hydraulic friction device to be released in a major part of the control function of the ECU shown in FIG. 3, i.e., in the shift control operation of the automatic transmission during a downshift of the automatic transmission while the vehicle is decelerating.
Figure 11:
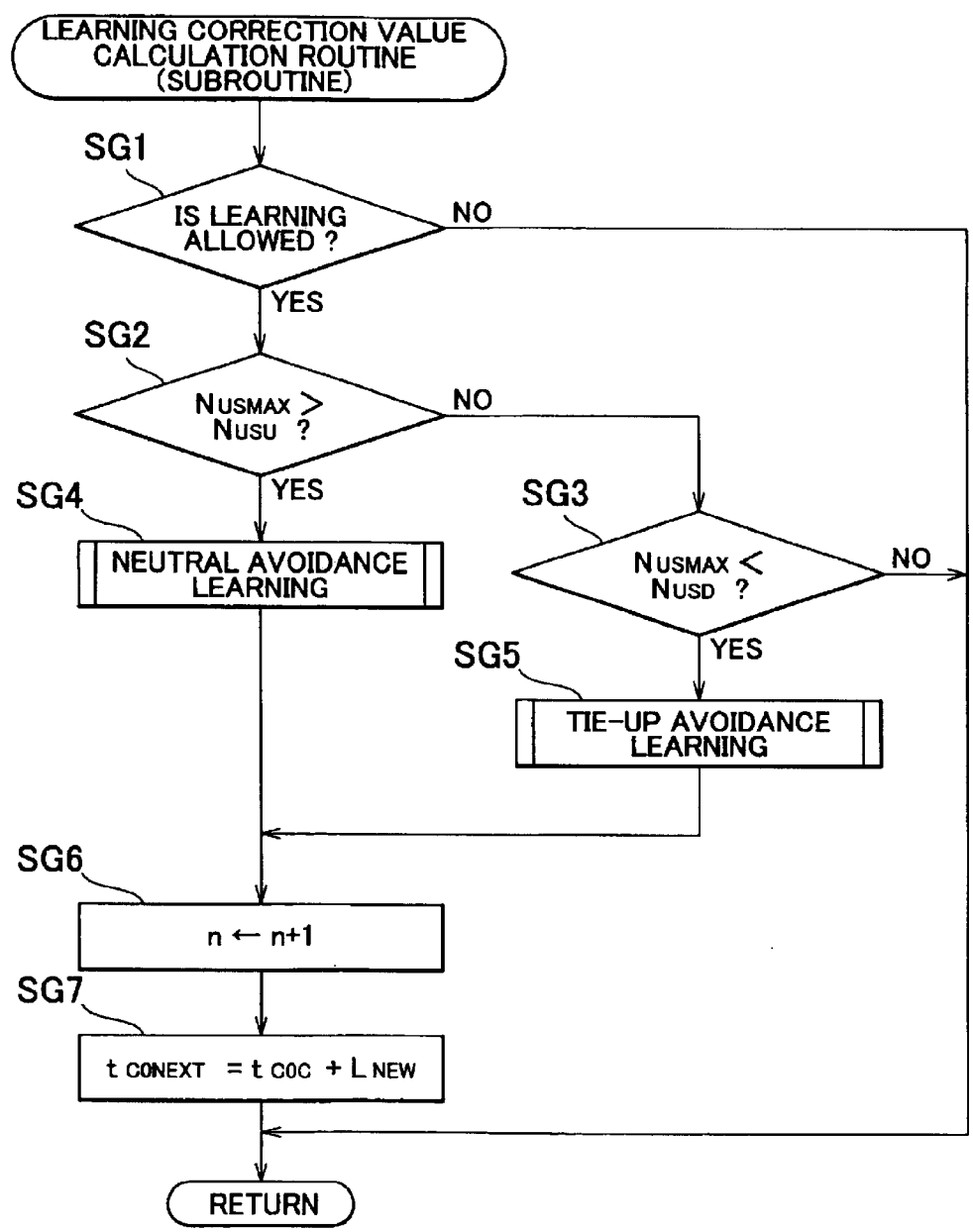
FIG. 11 is a flowchart of a learning correction value calculating routine which is a subroutine in the routine shown in FIG. 10.
Figure 12:
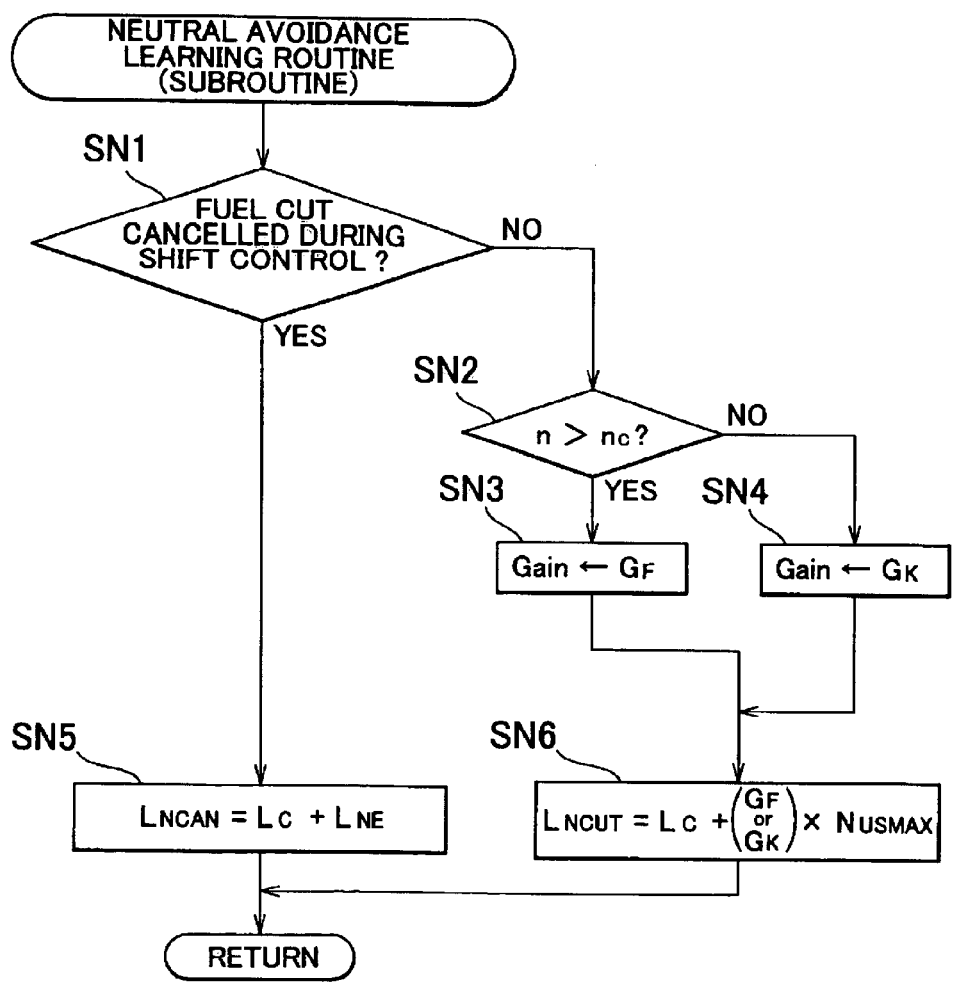
FIG. 12 is a flowchart of a neutral avoidance learning routine which is a subroutine in the routine shown in FIG. 11.
Figure 13:
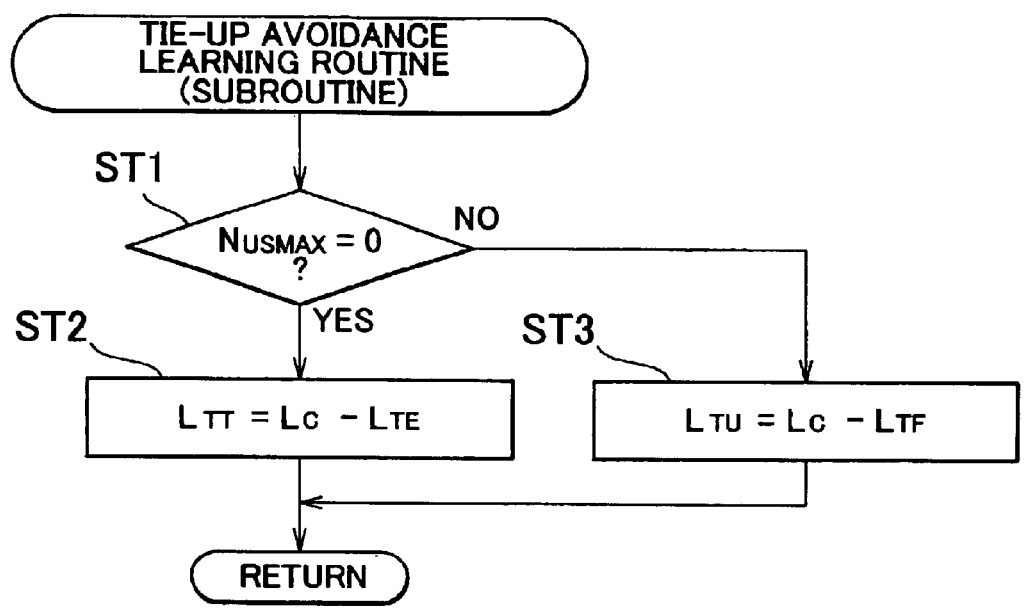
FIG. 13 is a flowchart of a tie-up avoidance learning routine which is a subroutine in the routine shown in FIG. 11.

FIG. 10 is a flowchart illustrating a main routine for explaining the learning correction routine of the time until the start of sweep control $t_{COW}$ of the release driving signal $S_{PC0}$ output to the linear solenoid valve SL2 which directly controls the apply pressure $P_{C0}$ of the clutch C0, which is the hydraulic friction device to be released, in a major part of the control operation of the ECU 90, i.e., in the shift control operation of the automatic transmission 14 during a clutch-to-clutch downshift while decelerating. FIG. 11 is a flowchart of a learning correction value calculating routine which is a subroutine in the routine shown in FIG. 10. FIG. 12 is a flowchart of a neutral avoidance learning routine which is a subroutine in the routine shown in FIG. 11. FIG. 13 is a flowchart of a tie-up avoidance learning routine which is a subroutine in the routine shown in FIG. 11.

Referring to FIG. 10, steps S1 and S2 correspond to the memory state determining means 138. In step S1 it is determined whether EPROM, such as EEPROM (electrically erasable programmable read-only memory), in which is stored the learning correction value L and the like, has just been installed in the vehicle and is in a state in which the learning correction routine has not yet been executed, or whether EEPROM which has just been replaced is in a state in which the learning correction routine has not yet been executed. In step S2, it is determined whether the learning correction routine has been executed after the EEPROM has been initialized (i.e., cleared). If the determination in step S1 or step S2 is YES, the process proceeds on to step S3, which corresponds to the learning number updating means 140, in which the learning number n is updated so that n=0, and that value is stored in the EEPROM. If the determination in both steps S1 and S2 is NO, step S3 is not executed and the value of the learning number n stored in the EEPROM is maintained.

Next, in step S4, which corresponds to the shift state determining means 122, it is determined whether the shift (i.e., hydraulic pressure control) of the automatic transmission 14 has started. If the determination in step S4 is NO, the routine ends. If the determination is YES, however, the value of the maximum undershooting amount $N_{USMAX}$ is set to $N_{USMAX}$=0 in step S5, which corresponds to the undershooting amount calculating means 132. Steps S6 and S7 both correspond to the undershooting amount calculating means 132. In step S6, first, the current undershooting amount $N_{USC}$ is derived from the difference ($N_{US}$=$N_{TP}$-$N_T$) between the rotational speed $\gamma_3 \times N_{OUT}$ (i.e., the estimated turbine rotational speed $N_{TP}$) calculated from the rotational speed $N_{OUT}$ of the countershaft 44 and the gear ratio $\gamma_3$ of the speed before the shift (e.g., third speed), and the actual turbine rotational speed $N_T$. Then, it is determined whether the current undershooting amount $N_{USC}$ is greater than the maximum undershooting amount $N_{USMAX}$. If the determination in step S6 is YES, then in step S7 the current undershooting amount $N_{USC}$ is made the maximum undershooting amount $N_{USMAX}$ and the memory of the maximum undershooting amount $N_{USMAX}$ is updated.

Next, in step S8, which corresponds to the inertia start determining means 130, it is determined whether the turbine rotational speed $N_T$ has started to increase. Step S6 is repeatedly executed until the determination in step S8 is YES. Only when the determination in step S6 is YES is the current undershooting amount $N_{USC}$ made the maximum undershooting amount $N_{USMAX}$ and the memory of the maximum undershooting amount $N_{USMAX}$ sequentially updated in step S7. That is, in steps S5 to S8, even if the value of the maximum undershooting amount $N_{USMAX}$ is determined and the automatic transmission 14 is in a tie-up state in which undershooting will not occur, the maximum undershooting amount $N_{USMAX}$ is determined so as to equal 0. If the determination in step S8 is YES, it is determined in step S9, which corresponds to the shift state determining means 122, whether the apply pressure $P_{B1}$ detected by the hydraulic pressure sensor 106 that is connected to the brake B1, which is the hydraulic friction device to be applied, has reached the maximum value so that the brake B1 is fully applied, and the shift hydraulic pressure control has ended. Step S9 is repeatedly executed until the determination is YES, i.e., until the shift hydraulic pressure control has ended.

Next, in steps SG1 to SG7 in FIG. 11, which correspond to step S10 in FIG. 10, the new learning correction value $L_{NEW}$($L_{NCUT}$, $L_{NCAN}$, $L_{TU}$ or $L_{TT}$) to be added to the current time until the start of sweep control $t_{COC}$ ($t_{COCOT}$, $t_{COCAN}$ or $t_{COT}$) of the clutch C0, which is the hydraulic friction device to be released, is obtained and the next time until the start of sweep control $t_{CONEXT}$ ($t_{CONG}$, $t_{CONE}$ or $t_{CONT}$, =$t_{COC}$+$L_{NEW}$) of the apply pressure $P_{C0}$ of the clutch C0 is calculated. In step SG1, which corresponds to the learning allowance determining means 136, it is determined whether a condition to start the learning correction routine has been fulfilled. That determination is made based, for example, on whether the AT fuel temperature $T_{OIL}$ and the coolant temperature $T_W$ of the engine 10 and the like are stable, whether various sensors such as the AT fluid temperature sensor 78 and the coolant temperature sensor 68, or the turbine rotational speed sensor 76 and the like, are operating normally, and whether the shift is a single shift such as a 3→2 downshift. If the determination in step SG1 is NO, the routine ends.

If the determination in step SG1 is YES, then it is determined in step SG2, which corresponds to the undershooting amount determining means 134, whether the maximum undershooting amount $N_{USMAX}$ determined in steps S5 to S8 is equal to, or greater than, the target undershooting amount $N_{USU}$. If the determination in step SG2 is NO, it is determined in step SG3, which also corresponds to the undershooting amount determining means 134, whether the maximum undershooting amount $N_{USMAX}$ is equal to, or less than, the allowable undershooting amount $N_{USD}$. If the determination in either step SG2 or step SG3 is NO, the routine ends. That is, if the maximum undershooting amount $N_{USMAX}$ is between the target undershooting amount $N_{USU}$, which is the upper limit of the maximum undershooting amount $N_{USMAX}$, and the allowable undershooting amount $N_{USD}$, which is the lower limit of the maximum undershooting amount $N_{USMAX}$, there is no need to execute the learning correction routine so the routine ends. If the determination in step SG2 is YES, the new learning correction value $L_{NEW}$ ($L_{NCUT}$ or $L_{NCAN}$) to be added to the current time until the start of sweep control $t_{COC}$ ($t_{COCOT}$ or $t_{COCAN}$) of the clutch C0 in order to avoid the neutral tendency is obtained in steps SN1 to SN6 in FIG. 12, which correspond to step SG4 in FIG. 11. If the determination in step SG3 is YES, the new learning correction value $L_{NEW}$ ($L_{TU}$ or $L_{TT}$) to be added to the current time until the start of sweep control $t_{COC}$ ($t_{COT}$) of the clutch C0 in order to avoid tie-up is obtained in steps ST1 to ST3 in FIG. 13, which correspond to step SG5 in FIG. 11.

In step SN1, which corresponds to the fuel cut state determining means 128, it is determined whether a command to cut off the fuel supply to the engine 10 which is output to the fuel cut apparatus 118 by the fuel cut controlling means 126 during the downshift control operation while the vehicle is decelerating has been cancelled. In step SN2, which corresponds to the learning number determining means 142, it is determined whether the learning number n of the learning correction routine for the time until the start of sweep control stored in the EEPROM is exceeding the predetermined number $n_C$, for example, 2 to 5. Then, in steps SN3 to SN6, which correspond to the learning correction value calculating means 146, the learning correction value for avoiding the neutral tendency according to the results of steps SN1 and SN2 is calculated. That is, if the determination in step SN1 is NO and the determination in step SN2 is YES, the normal learning gain $G_F$ is made the gain in step SN3 for the normal learning routine. Then in step SN6, a new learning correction value $L_{NCUT}$ (=$L_C$+$G_F$×$N_{USMAX}$) is calculated by adding the product of the normal learning gain $G_F$ and the maximum undershooting amount $N_{USMAX}$ to the current learning correction value $L_C$.

Further, if the determinations in both steps SN1 and SN2 are NO, because the dispersion in the maximum undershooting amount $N_{USMAX}$ due to deviation among vehicles from the learning number n being low is unavoidable, the high speed learning gain $G_K$, which is a value larger than the normal learning gain $G_F$, is made the gain in step SN4 so that the learning correction value L is quickly reflected in the next shift control operation, and in step SN6, the product of the high speed gain $G_K$ and the maximum undershooting amount $N_{USMAX}$ is added to the current learning correction value $L_C$ to obtain the new learning correction value $L_{NCUT}$ (=$L_C$+$G_K$×$N_{USMAX}$). Also, if the determination in step SN1 is YES, because the fuel cut is cancelled due to the fact that the undershooting amount $N_{EUS}$ of the engine 10 is large, as well as in order to improve fuel efficiency and the like, an undershooting amount $N_{US}$ ($N_{EUS}$) which does not cancel the fuel cut is necessary in the fewest number of times possible. Therefore, in step SN5, the new learning correction value $L_{NCAN}$ ($L_{NCAN}$=$L_C$+$L_{NE}$) is obtained by adding the learning correction value for emergency neutral avoidance learning $L_{NE}$ to the current learning correction value $L_C$. The value of the maximum undershooting amount $N_{USMAX}$ derived from the undershooting amount $N_{US}$ will not be the correct maximum value because the fuel cut has been cancelled and the engine speed $N_E$ has increased. Therefore, a predetermined value, not the product of the maximum undershooting amount $N_{USMAX}$ and the gain G used during normal learning and the like, is used as the value of the learning correction value for emergency neutral avoidance learning $L_{NE}$.

In step ST1, which corresponds to the undershooting amount determining means 134, it is determined whether the maximum undershooting amount $N_{USMAX}$ is equal to, or less than, the zero determination value. If the determination in step ST1 is NO, the undershooting amount $N_{US}$ or $N_{EUS}$ of the turbine rotational speed $N_T$ or the engine speed $N_E$ is generated to some extent, but the state of the automatic transmission 14 is close to tie-up so the new learning correction value $L_{TU}$ (=$L_C$−$L_{TF}$) is obtained by subtracting the learning correction value for normal learning $L_{TF}$ from the current learning correction value $L_C$ so as to shorten the current time until the start of sweep control $t_{COC}$ ($t_{COT}$) of the clutch C0. If the determination in step SN1 is YES, the automatic transmission 14 is in the tie-up state so the new learning correction value $L_{TT}$ (=$L_C$−$L_{TE}$) is obtained by subtracting the learning correction value for emergency tie-up avoidance learning $L_{TE}$ from the current learning correction value $L_C$ so that the current time until the start of sweep control $t_{COC}$ ($t_{COT}$) becomes shorter than that for normal learning with one execution of the learning correction routine in order to quickly avoid shift shock. A predetermined value is used for the learning correction value for normal learning $L_{TF}$ or the learning correction value for emergency tie-up avoidance learning $L_{TE}$.

When the new learning correction value $L_{NEW}$ ($L_{NCUT}$, $L_{NCAN}$, $L_{TU}$ or $L_{TT}$) is obtained in step SG4 (i.e., steps SN1 to SN6) or step SG5 (i.e., steps ST1 to ST3), the learning number n is updated in step SG6, which corresponds to the learning number updating means 140, by adding 1 to the last learning number n stored in the EEPROM, and that value is stored in the EEPROM.

Next, in step SG7, which corresponds to the sweep start time calculating means 148, the next time until the start of sweep control $t_{CONEXT}$ ($t_{CONG}$, $t_{CONE}$ or $t_{CONT}$, =$t_{COC}$+$L_{NEW}$) of the apply pressure $P_{C0}$ of the clutch C0 is calculated by adding the new learning correction value $L_{NEW}$ ($L_{NCUT}$, $L_{NCAN}$, $L_{TU}$ or $L_{TT}$) obtained by the learning correction value calculating means 146 to the current time until the start of sweep control $t_{COC}$ ($t_{COCUT}$, $t_{COCAN}$ or $t_{COT}$). The new learning correction value $L_{NEW}$ is calculated in step SG4 (i.e., steps SN1 to SN6) or step SG5 (i.e., steps ST1 to ST3) such that $L_{NCAN}$>$L_{NCUT}$>0 in order to increase the current time until the start of sweep control $t_{COC}$ when there is a neutral tendency, and such that $L_{TT}$<$L_{TU}$<0 in order to reduce the current time until the start of sweep control $t_{COC}$ when there is a tie-up tendency.

FIG. 14 is a time chart illustrating a case in which the normal learning routine or the high speed learning routine for the neutral tendency is executed in the shift control operation of the automatic transmission 14 during a downshift while the vehicle is decelerating, according to the exemplary embodiment. In the drawing, the solid lines denote values before execution of the learning routine and the broken lines denote values after execution of the learning routine. As illustrated in the drawing, after execution of the learning routine, the time until the start of sweep control is increased from $t_{C0CUT}$ (the current time until the start of sweep control $t_{C0C}$) to $t_{C0NG}$ (the next time until the start of sweep control $t_{C0NEXT}$ of the apply pressure $P_{C0}$ of the clutch C0). As a result, an undershoot U from insufficient apply pressure $P_{C0}$ by the clutch C0, which is the hydraulic friction device to be released, is reduced. Therefore, shift shock (a phenomenon resembling momentary engine brake) when the engine speed $N_E$ increases due to application of the brake B1 is reduced. Also, the increase in the turbine rotational speed $N_T$ is started earlier (inertia start, time $t_{1NG}$), and as a result, the shift control (hydraulic pressure control) ends sooner, at time $t_{3NG}$ instead of time $t_{3N}$. This is substantially the same amount of time as the time from the inertia start until the end of the hydraulic pressure control, so if the inertia start is moved back (i.e., started earlier), the hydraulic pressure control will end earlier. Also, the only difference in the expression for obtaining the new learning correction value $L_{NCUT}$ (=$L_C$+G×$N_{USMAX}$) for the normal learning routine and the high speed learning routine is that the gain G is made either the normal learning gain $G_F$ or the high speed learning gain $G_K$ depending on the learning number n. Therefore, except for the fact that the difference between the time until the start of sweep control after learning and the time until the start of sweep control before learning (i.e., $t_{C0NG}$-$t_{C0CUT}$) is greater with the high speed learning routine, the normal learning routine and the high speed learning routine are the same.

Figure 15:
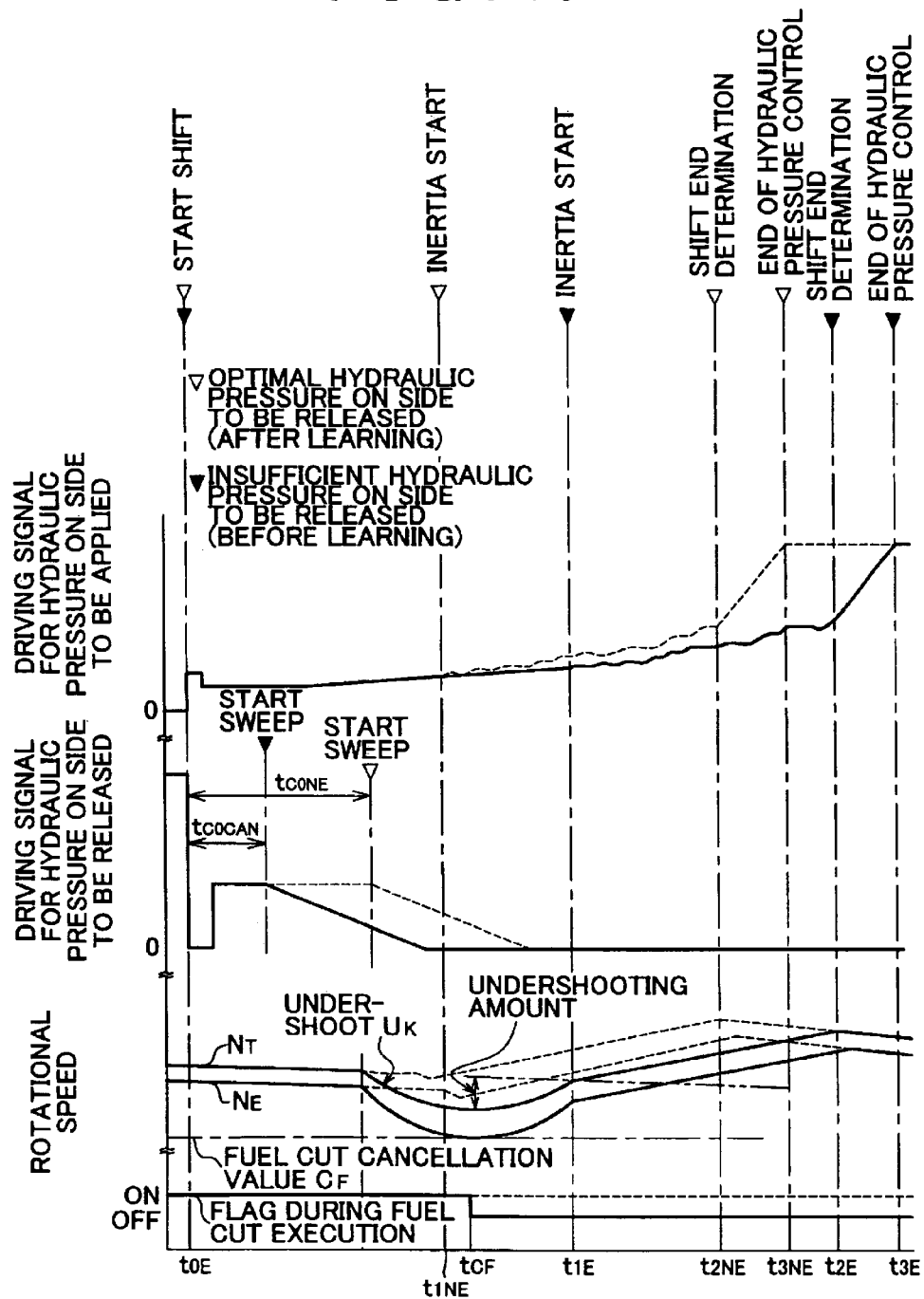
FIG. 15 is a time chart illustrating a case in which an emergency learning routine for the neutral tendency is executed in a major part of the control function of the ECU shown in FIG. 3, i.e., in the shift control operation of the automatic transmission during a downshift while the vehicle is decelerating.

FIG. 15 is a time chart illustrating a case in which the emergency learning routine for the neutral tendency is executed in the shift control operation of the automatic transmission 14 during a downshift while the vehicle is decelerating, according to the exemplary embodiment. In the drawing, the solid lines denote values before execution of the learning routine and the broken lines denote values after execution of the learning routine. From the drawings, it is evident that the only substantial difference between the cases shown in FIG. 14 and FIG. 15 is that, before execution of the learning routine, the engine speed $N_E$ drops to the fuel cut cancellation value $C_F$ in FIG. 15 because the undershoot $U_K$ in FIG. 15 is greater than the undershoot U in FIG. 14, and as a result, the fuel cut is canceled (time $t_{CF}$). After the learning routine, the time until the start of sweep control is increased from $t_{C0CAN}$ (the current time until the start of sweep control $t_{C0C}$) to $t_{C0NE}$ (the next time until the start of sweep control $t_{C0NEXT}$ of the apply pressure $P_{C0}$ of the clutch C0). As a result, the undershoot $U_K$ from insufficient apply pressure $P_{C0}$ by the clutch C0, which is the hydraulic friction device to be released, is reduced. Also, the increase in the turbine rotational speed $N_T$ is started earlier (inertia start, time $t_{1NE}$), and as a result, the shift control (i.e., hydraulic pressure control) ends sooner, at time $t_{3NE}$ instead of time $t_{3E}$. Further, fuel efficiency is improved because the fuel cut is continued.

Figure 16:
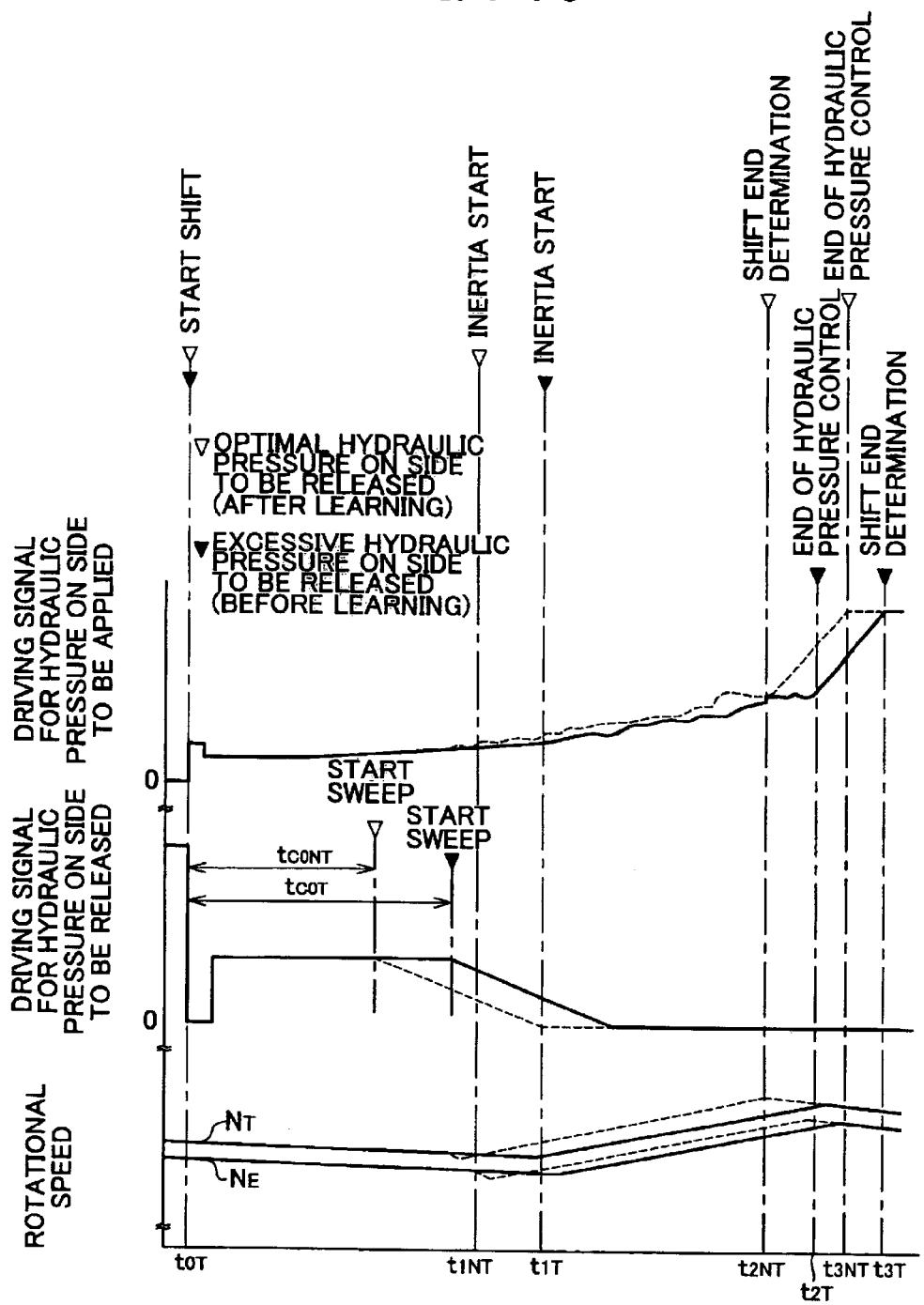
FIG. 16 is a time chart illustrating a case in which an emergency learning routine for tie-up is executed in a major part of the control function of the ECU shown in FIG. 3, i.e., in the shift control operation of the automatic transmission during a downshift while the vehicle is decelerating.

FIG. 16 is a time chart illustrating a case in which the emergency learning routine for tie-up is executed in the shift control operation of the automatic transmission 14 during a downshift while the vehicle is decelerating, according to the exemplary embodiment. In the drawing, the solid lines denote values before execution of the learning routine and the broken lines denote values after execution of the learning routine. As can be seen in the drawing, after execution of the learning routine, the time until the start of sweep control is decreased from $t_{C0T}$ (the current time until the start of sweep control $t_{C0C}$) to $t_{C0NT}$ (the next time until the start of sweep control $t_{C0NEXT}$ of the apply pressure $P_{C0}$ of the clutch C0). As a result, the apply pressure $P_{C0}$ of the clutch C0, which is the hydraulic friction device to be released, decreases sooner, thus reducing the degree of overlap between the application of the clutch C0 and the application of the brake B1. As a result, shift shock due to lockup, i.e., tie-up, of the automatic transmission 14 is reduced. Further, the increase in the turbine rotational speed $N_T$ is started earlier (inertia start, time $t_{1NT}$), and as a result, the shift control (i.e., hydraulic pressure control) ends sooner, at time $t_{3NT}$ instead of time $t_{3T}$. Also, the normal learning routine and the emergency learning routine are substantially the same except for i) the fact that the difference between the time until the start of sweep control before learning and the time until the start of sweep control after learning (i.e., $t_{C0T}$-$t_{C0NT}$), which differs depending on whether, in the expression for obtaining the new learning correction value $L_{NEW}$ (=$L_{TU}$, $L_{TT}$), the new learning correction value $L_{TU}$ (=$L_C$-$L_{TF}$) derived by subtracting the learning correction value for normal learning $L_{TF}$ from the current learning correction value $L_C$, or the new learning correction value $L_{TT}$ (=$L_C$-$L_{TE}$) derived by subtracting the learning correction value for emergency tie-up avoidance learning $L_{TE}$ from the current learning correction value $L_C$ is calculated, is larger with the emergency learning routine, and ii) the fact that, with the normal learning routine, the automatic transmission 14 is close to being in a tie-up state such that an undershoot is generated.

Accordingly, in the exemplary embodiment, the learning controlling means 144 (step S10) corrects, through learning control, the apply pressure of the at least one of the hydraulic friction devices operated for the clutch-to-clutch downshift based on whether the amount of drop (i.e., the maximum undershooting amount $N_{USMAX}$) in the rotational speed $N_{IN}$ of the input shaft (i.e., the turbine rotational speed $N_T$) of the automatic transmission 14 has exceeded the predetermined value (i.e., the target undershooting amount $N_{USU}$) during a clutch-to-clutch downshift while decelerating, so as to reduce the amount of drop in the rotational speed $N_{IN}$ of the input shaft. As a result, during a clutch-to-clutch downshift while decelerating, the drop in the engine speed $N_E$ is automatically suppressed such that shift shock and a delay in the shift time caused by that drop in the engine speed $N_E$ is appropriately reduced or eliminated. Further, it is possible to appropriately avoid the case in which fuel efficiency deteriorates due to fuel being supplied again to the engine as a result of a further drop in the engine speed $N_E$.

Also, according to the exemplary embodiment, the apply pressure of the at least one the hydraulic friction devices operated for the clutch-to-clutch downshift is quickly corrected through learning so that the amount of drop $N_{US}$ in the rotational speed $N_{IN}$ of the input shaft is reduced faster when the amount of drop $N_{USMAX}$ is large than when the amount of drop $N_{USMAX}$ is small by using a larger learning correction value. As a result, during the clutch-to-clutch downshift while decelerating, the drop $N_{EUS}$ in the engine speed $N_E$ is automatically suppressed quickly such that shift shock and a delay in the shift time caused by that drop in the engine speed $N_E$ is appropriately reduced or eliminated. Further, it is possible to appropriately avoid the case in which fuel efficiency deteriorates due to fuel being supplied again to the engine as a result of a further drop in the engine speed $N_E$.

Also according to the exemplary embodiment, when a command for the clutch-to-clutch downshift is output, the shift hydraulic pressure controlling means 124 maintains the apply pressure $P_{C0}$ of the hydraulic friction device to be released (i.e., the clutch C0) for the predetermined holding time $t_{COW}$ at the predetermined holding pressure $P_{COW}$ which is set lower than the base pressure of the apply pressure $P_{C0}$ and higher than the pressure at which the hydraulic friction device to be released starts to release. The shift hydraulic pressure controlling means 124 then smoothly decreases the apply pressure $P_{C0}$ of the hydraulic friction device to be released (i.e., the clutch C0) at a constant rate, while increasing the apply pressure $P_{B1}$ of the hydraulic friction device to be applied (i.e., the brake B1) so that the rotational speed $N_{IN}$ of the input shaft (i.e., the turbine rotational speed $N_T$) smoothly increases at a constant rate. As a result, the clutch-to-clutch downshift is able to be appropriately executed.

Also according to the exemplary embodiment, when the amount of drop (i.e., the maximum undershooting amount $N_{USMAX}$) in the rotational speed $N_{IN}$ of the input shaft (i.e., the turbine rotational speed $N_T$) exceeds the predetermined value (i.e., the target undershooting amount $N_{USU}$) the learning controlling means 144 (step S10) corrects the holding time $t_{COW}$ of the holding pressure (i.e., the current time until the start of sweep control $t_{COC}$) of the hydraulic friction device to be released (i.e., the clutch C0) through learning so that it becomes longer. As a result, the amount of drop $N_{US}$ in the rotational speed $N_{IN}$ of the input shaft is reduced.

Also according to the exemplary embodiment, when the amount of drop (i.e., the maximum undershooting amount $N_{USMAX}$) in the rotational speed $N_{IN}$ of the input shaft (i.e., the turbine rotational speed $N_T$) of the automatic transmission 14 exceeds the predetermined value (i.e., the target undershooting amount $N_{USU}$) but is small enough so that the fuel cut will not be cancelled, the learning controlling means 144 (step S10) corrects, so as to delay, the time at which to start decreasing pressure $t_{CONEXT}$ ($t_{CONG}$, =$t_{COC}$+$L_{NEW}$) from the holding pressure $P_{COW}$ of the hydraulic friction device to be released in the next clutch-to-clutch downshift through learning by i) adding the product of the gain (i.e., the normal learning gain $G_F$) and that amount of drop $N_{USMAX}$ to the current learning correction value $L_C$ to derive the new learning correction value $L_{NEW}$ ($L_{NCUT}$, =$L_C$+$G_F$×$N_{USMAX}$), and then ii) adding that learning correction value $L_{NCUT}$ to the time at which to start decreasing pressure (i.e., the current time until the start of sweep control $t_{COC}$ ($t_{COCUT}$)) from the holding pressure $P_{COW}$ of the hydraulic friction device to be released (i.e., the clutch C0) in the last clutch-to-clutch downshift. As a result, the amount of drop $N_{US}$ in the rotational speed $N_{IN}$ of the input shaft is reduced according to that amount of drop $N_{US}$.

Also according to the exemplary embodiment, when the amount of drop (i.e., the maximum undershooting amount $N_{USMAX}$) in the rotational speed $N_{IN}$ of the input shaft (i.e., the turbine rotational speed $N_T$) of the automatic transmission 14 exceeds the predetermined value (i.e., the target undershooting amount $N_{USU}$) but is small enough so that the fuel cut will not be cancelled, the learning controlling means 144 (step S10) uses a larger learning correction value $L_{NEW}$ ($L_{NCUT}$, =$L_C$+$G_K$×$N_{USMAX}$, where $G_K$ is the high speed learning gain) to correct the holding time of the holding pressure (i.e., the current time until the start of sweep control $t_{COC}$ ($t_{COCUT}$)) of the hydraulic friction device to be released through learning to be longer when it has been determined by the learning number determining means 142 (step SN2) that the number of times the learning control has been performed is less than the predetermined number $n_C$ than when it has been determined that the number of times the learning control has been performed is greater than the predetermined number $n_C$. As a result, the amount of drop $N_{US}$ in the rotational speed $N_{IN}$ of the input shaft is quickly reduced.

Also according to the exemplary embodiment, even when it has been determined by the fuel cut state determining means 128 (step SN1) that the fuel cut has been cancelled, the learning controlling means 144 (step S10) corrects the holding time of the holding pressure (i.e., the current time until the start of sweep control $t_{COC}$ ($t_{COCAN}$)) of the hydraulic friction device to be released through learning so that the holding time of the holding pressure is longer than when it is determined that the fuel cut is still being executed by using a larger learning correction value $L_{NEW}$ ($L_{NCAN}$, =$L_C$+$L_{NE}$). As a result, the amount of drop $N_{US}$ in the rotational speed $N_{IN}$ of the input shaft is quickly reduced to where the fuel cut will not be cancelled. Further, fuel efficiency is improved when the fuel cut is continued.

Also according to the exemplary embodiment, when the amount of drop (i.e., the maximum undershooting amount $N_{USMAX}$) in the rotational speed $N_{IN}$ of the input shaft (i.e., the turbine rotational speed $N_T$) of the automatic transmission 14 exceeds the predetermined value (i.e., the target undershooting amount $N_{USU}$) during the clutch-to-clutch downshift while decelerating, the learning controlling means 144 (step S10) quickly corrects the apply pressure of the at least one of the hydraulic friction devices operated for the clutch-to-clutch downshift through learning so that the amount of drop $N_{US}$ in the rotational speed $N_{IN}$ of the input shaft is reduced faster when it has been determined by the learning number determining means 142 (step SN2) that the number of times the learning control has been performed is less than the predetermined number $n_C$ than when it has been determined that the number of times the learning control has been performed is greater than the predetermined number $n_C$ by using a larger learning correction value $L_{NEW}$ ($L_{NCUT}$=$L_C$+$G_K$×$N_{USMAX}$, where $G_K$ is the high speed learning gain). As a result, the amount of drop $N_{EUS}$ in the engine speed $N_E$ is quickly and automatically suppressed such that shift shock and a delay in the shift time caused by that drop in the engine speed $N_E$ is appropriately reduced or eliminated.

Also according to the exemplary embodiment, when the amount of drop (i.e., the maximum undershooting amount $N_{USMAX}$) in the rotational speed $N_{IN}$ of the input shaft (i.e., the turbine rotational speed $N_T$) of the automatic transmission 14 exceeds the predetermined value (i.e., the target undershooting amount $N_{USU}$) during the clutch-to-clutch downshift while decelerating, the learning controlling means 144 (step S10) quickly corrects the apply pressure of the at least one of the hydraulic friction devices operated for the clutch-to-clutch downshift through learning so that the amount of drop $N_{US}$ in the rotational speed $N_{IN}$ of the input shaft is reduced faster when it has been determined by the fuel cut state determining means 128 (step SN1) that the fuel cut has been cancelled than when it has been determined that the fuel cut is still in effect by using a larger learning correction value $L_{NEW}$ ($L_{NCAN}$, =$L_C$+$L_{NE}$). As a result, during the clutch-to-clutch downshift while the vehicle is decelerating, the amount of drop $N_{EUS}$ in the engine speed $N_E$ is quickly and automatically suppressed such that shift shock and a delay in the shift time caused by that drop in the engine speed $N_E$ is appropriately reduced or eliminated.

Although the invention has been described in detail in terms of exemplary embodiments with reference to the drawings, the invention is not limited to those exemplary embodiments.

For example, in the foregoing exemplary embodiment, the clutch-to-clutch downshift operation of the automatic transmission 14 during deceleration of the vehicle is performed with a 3→2 downshift. Alternatively, however, the operation may also be performed with a 5→4, 4→3, 2→1 or other downshift.

Also, in the exemplary embodiment, the automatic transmission 14 is a FF transverse-mounted transmission with five forward speeds which is constructed of a combination of three planetary gearsets 40, 42, and 46. Alternatively, however, the number of planetary gearsets which in combination make up the automatic transmission 14 may be a number other than three. The automatic transmission 14 may also be a longitudinal-mounted transmission for a FR (front engine, rear drive) vehicle, or the like.

Also in the exemplary embodiment, the learning controlling means 144 corrects the time at which to start decreasing pressure (i.e., the current time until the start of sweep control $t_{COC}$ ($t_{COCUT}$)) from the predetermined apply pressure $P_{C0W}$ of the clutch C0, which is the hydraulic friction device to be released, through learning so that it is delayed, and reduces the undershoot amount U so as to avoid the neutral tendency. Alternatively, however, the neutral tendency may also be avoided by correcting the predetermined apply pressure $P_{C0W}$ through learning so that it increases, thus delaying the time at which the clutch C0 is released and reducing the undershoot amount U. Also, the neutral tendency may also be avoided by reducing the undershoot amount U by applying the brake B1 sooner by having the learning controlling means 144 correct, through learning, the time at which to start increasing pressure (i.e., the time during which the apply pressure $P_{B1W}$ is maintained after the start of the shift) from the predetermined apply pressure $P_{B1W}$ that is set lower than the pressure at which the apply pressure $P_{B1}$ of the brake B1, which is the hydraulic friction device to be applied, starts to be applied, so as to advance the time at which to start increasing pressure (i.e., shorten the time during which the apply pressure $P_{B1W}$ is maintained after the start of the shift), or correct the predetermined apply pressure $P_{B1W}$ so as to make it larger.

Also in the exemplary embodiment, the predetermined number $n_C$ used when the learning number determining means 142 (step SN2) determines whether the normal learning routine may be performed is set to a value of 2 to 5. Alternatively, however, the predetermined number $n_C$ may be set to another value as appropriate depending on the deviation among vehicles. For example, if there is much deviation among vehicles, the predetermined number $n_C$ may be set to 10 or thereabouts.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. A shift control apparatus for a vehicular automatic transmission, comprising:
   a fuel cut apparatus which performs a fuel cut in which a supply of fuel to an engine is cut off when an engine speed exceeds a predetermined value during deceleration of a vehicle;
   an automatic transmission in which a gear shift is achieved with a clutch-to-clutch downshift in which a hydraulic friction device to be released is released and a hydraulic friction device to be applied is applied; and
   a controller which corrects, through learning control, an apply pressure of at least one of the hydraulic friction devices to be operated for the clutch-to-clutch downshift such that an amount of drop in a rotational speed of an input shaft of the automatic transmission decreases when that amount of drop exceeds a predetermined value during the clutch-to-clutch downshift.

2. The shift control apparatus for a vehicular automatic transmission according to claim 1, wherein the controller corrects the apply pressure of the at least one of the hydraulic friction devices through learning using a larger learning correction value when the amount of drop in the rotational speed of the input shaft is large than when that amount of drop is small.

3. The shift control apparatus for a vehicular automatic transmission according to claim 1, wherein, when a command for the clutch-to-clutch downshift is output, the controller maintains the apply pressure of the hydraulic friction device to be released for a predetermined holding time at a predetermined holding pressure which is set lower than a base pressure of the apply pressure and higher than a pressure at which the hydraulic friction device to be released starts to release, and then smoothly decreases the apply pressure of the hydraulic friction device to be released at a constant rate, while increasing the apply pressure of the hydraulic friction device to be applied so that the rotational speed of the input shaft smoothly increases at a constant rate.

4. The shift control apparatus for a vehicular automatic transmission according to claim 3, wherein the controller corrects the holding time of the holding pressure of the hydraulic friction device to be released through learning so as to increase when the amount of drop in the rotational speed of the input shaft exceeds the predetermined value.

5. The shift control apparatus for a vehicular automatic transmission according to claim 3, wherein, when the amount of drop in the rotational speed of the input shaft of the automatic transmission is small enough so that the fuel cut by the fuel cut apparatus will not be cancelled, the controller obtains a time at which to start decreasing pressure from the holding pressure of the hydraulic friction device to be released in the next clutch-to-clutch downshift by calculating a learning correction value by multiplying a gain by the amount of drop and adding the learning correction value to the time at which to start decreasing pressure from the holding pressure of the hydraulic friction device to be released in the last clutch-to-clutch downshift.

6. The shift control apparatus for a vehicular automatic transmission according to claim 3, wherein the controller determines the number of times learning control has been performed, and, when the amount of drop in the rotational speed of the input shaft of the automatic transmission exceeds the predetermined value but is small enough so that the fuel cut will not be cancelled by the fuel cut apparatus, the controller corrects, through learning, the holding time of the holding pressure of the hydraulic friction device to be released so as to be longer when it has been determined that the number of times the learning control has been performed is less than a predetermined number than when it has been determined that the number of times the learning control has been performed is greater than the predetermined number by using a larger learning correction value.

7. The shift control apparatus for a vehicular automatic transmission according to claim 3, wherein the controller determines whether the fuel cut is being executed by the fuel cut apparatus, and corrects the holding time of the holding pressure of the hydraulic friction device to be released through learning so as to be longer when it has been determined that the fuel cut has been cancelled than when it has been determined that the fuel cut is still being executed by using a larger learning correction value.

8. The shift control apparatus for a vehicular automatic transmission according to claim 1, wherein the controller determines the number of times learning control has been performed, and corrects the apply pressure of the at least one of the hydraulic friction devices through learning using a larger learning correction value when it has been determined that the number of times the learning control has been performed is less than a predetermined number than when it has been determined that the number of times the learning control has been performed is greater than the predetermined number.

9. The shift control apparatus for a vehicular automatic transmission according to claim 1, wherein the controller determines whether the fuel cut is being executed by the fuel cut apparatus, and corrects the apply pressure of the at least one of the hydraulic friction devices through learning using a larger learning correction value when it has been determined that the fuel cut has been cancelled than when it has been determined that the fuel cut is still being executed.

10. A shift control method for a vehicular automatic transmission provided with a fuel cut apparatus which performs a fuel cut in which a supply of fuel to an engine is cut off when an engine speed exceeds a predetermined value during deceleration of a vehicle, and an automatic transmission in which a gear shift is achieved with a clutch-to-clutch downshift in which a hydraulic friction device to be released is released and a hydraulic friction device to be applied is applied, the shift control method comprising the step of:

correcting, through learning control, an apply pressure of at least one of the hydraulic friction devices to be operated for the clutch-to-clutch downshift such that an amount of drop in a rotational speed of an input shaft of the automatic transmission decreases when that amount of drop exceeds a predetermined value during the clutch-to-clutch downshift.

11. The shift control method for a vehicular automatic transmission according to claim 10, further comprising the step of:

correcting the apply pressure of the at least one of the hydraulic friction devices through learning using a larger learning correction value when the amount of drop in the rotational speed of the input shaft is large than when that amount of drop is small.

12. The shift control method for a vehicular automatic transmission according to claim 10, further comprising the step of:

when a command for the clutch-to-clutch downshift is output, maintaining the apply pressure of the hydraulic friction device to be released for a predetermined holding time at a predetermined holding pressure which is set lower than a base pressure of the apply pressure and higher than a pressure at which the hydraulic friction device to be released starts to release, and then smoothly decreasing the apply pressure of the hydraulic friction device to be released at a constant rate, while increasing the apply pressure of the hydraulic friction device to be applied so that the rotational speed of the input shaft smoothly increases at a constant rate.

13. The shift control method for a vehicular automatic transmission according to claim 12, wherein the holding time of the holding pressure of the hydraulic friction device to be released is corrected through learning so as to increase when the amount of drop in the rotational speed of the input shaft exceeds the predetermined value.

14. The shift control method for a vehicular automatic transmission according to claim 12, wherein, when the amount of drop in the rotational speed of the input shaft of the automatic transmission is small enough so that the fuel cut by the fuel cut apparatus will not be cancelled, a time at which to start decreasing pressure from the holding pressure of the hydraulic friction device to be released in the next clutch-to-clutch downshift is obtained by calculating a learning correction value by multiplying a gain by the amount of drop and adding the learning correction value to the time at which to start decreasing pressure from the holding pressure of the hydraulic friction device to be released in the last clutch-to-clutch downshift.

15. The shift control method for a vehicular automatic transmission according to claim 12, further comprising the steps of:

determining the number of times learning control has been performed; and when the amount of drop in the rotational speed of the input shaft of the automatic transmission exceeds the predetermined value but is small enough so that the fuel cut will not be cancelled by the fuel cut apparatus, correcting the holding time of the holding pressure of the hydraulic friction device to be released through learning so as to be longer when it has been determined that the number of times the learning control has been performed is less than the predetermined number than when it has been determined that the number of times the learning control has been performed is greater than the predetermined number by using a larger learning correction value.

16. The shift control method for a vehicular automatic transmission according to claim 12, further comprising the steps of:

determining whether the fuel cut is being executed by the fuel cut apparatus; and correcting the holding time of the holding pressure of the hydraulic friction device to be released through learning so as to be longer when it has been determined that the fuel cut has been cancelled than when it has been determined that the fuel cut is still being executed by using a larger learning correction value.

17. The shift control method for a vehicular automatic transmission according to claim 10, further comprising the steps of:

determining the number of times learning control has been performed; and correcting the apply pressure of the at least one of the hydraulic friction devices through learning using a larger learning correction value when it has been determined that the number of times the learning control has been performed is less than a predetermined number than when it has been determined that the number of times the learning control has been performed is greater than the predetermined number.

18. The shift control method for a vehicular automatic transmission according to claim 10, further comprising the steps of:

determining whether the fuel cut is being executed by the fuel cut apparatus; and correcting the apply pressure of the at least one of the hydraulic friction devices through learning using a larger learning correction value when it has been determined that the fuel cut has been cancelled than when it has been determined that the fuel cut is still being executed.

* * * * *